United States Patent
Suzuki et al.

(10) Patent No.: US 12,369,506 B2
(45) Date of Patent: Jul. 29, 2025

(54) AUTOMATED DRIVING SYSTEM FOR WORK VEHICLE

(71) Applicant: Yanmar Power Technology Co., Ltd., Osaka (JP)

(72) Inventors: Akihiro Suzuki, Osaka (JP); Akihiro Nakahata, Osaka (JP); Yoshiharu Mizukura, Osaka (JP); Keita Kitano, Osaka (JP)

(73) Assignee: Yanmar Power Technology Co., Ltd., Osaka (JP)

(*) Notice: Subject to any disclaimer, the term of this patent is extended or adjusted under 35 U.S.C. 154(b) by 491 days.

(21) Appl. No.: 17/620,727

(22) PCT Filed: Jun. 17, 2020

(86) PCT No.: PCT/JP2020/023850
§ 371 (c)(1),
(2) Date: Dec. 19, 2021

(87) PCT Pub. No.: WO2020/256035
PCT Pub. Date: Dec. 24, 2020

(65) Prior Publication Data
US 2022/0408629 A1    Dec. 29, 2022

(30) Foreign Application Priority Data

Jun. 20, 2019  (JP) ................................. 2019-114954

(51) Int. Cl.
*A01B 69/04*    (2006.01)
*A01M 7/00*    (2006.01)
*G05D 1/00*    (2024.01)

(52) U.S. Cl.
CPC ......... *A01B 69/008* (2013.01); *A01M 7/0014* (2013.01); *G05D 1/0219* (2013.01); *G05D 1/0238* (2013.01)

(58) Field of Classification Search
CPC . A01B 69/008; A01M 7/0014; G05D 1/0219; G05D 1/0238; G05D 2201/0201; G05D 1/0278; G05D 1/0246
See application file for complete search history.

(56) References Cited

U.S. PATENT DOCUMENTS 4,600,999 A * 7/1986 Ito .................. A01B 69/008
                                                   701/25
4,628,454 A * 12/1986 Ito .................. G05D 1/0259
                                                   701/25

(Continued)

FOREIGN PATENT DOCUMENTS

| JP | 2019053470 A | 4/2019 |
| WO | 2019054057 A1 | 3/2019 |

*Primary Examiner* — Bhavesh V Amin
(74) *Attorney, Agent, or Firm* — Chris Mizumoto

(57) ABSTRACT

This automatic travel system for a work vehicle is provided with: a position information obtaining unit; and an automatic travel control unit that causes a work vehicle to automatically travel along a target path. The automatic travel control unit sets a control target position on the target path including a plurality of work paths arranged in parallel with each other and a plurality of turning paths that connect the work paths in an order of travel of the work vehicle, to enable automatic travel of the work vehicle along the target path. The automatic travel control unit, when the work vehicle is positioned on a work path in the vicinity of a boundary with a turning path, sets the control target position on an extension of the work path. The automatic travel control unit, when the work vehicle is positioned on a turning path in the vicinity of a boundary with a work path, sets the control target position on the work path.

4 Claims, 23 Drawing Sheets

(56) References Cited

U.S. PATENT DOCUMENTS

| | | | | |
|---|---|---|---|---|
| 6,128,574 A * | 10/2000 | Diekhans | G05D 1/0278 | 701/410 |
| 7,689,356 B2 * | 3/2010 | Dix | G05D 1/0219 | 701/425 |
| 7,715,979 B2 * | 5/2010 | Dix | A01B 69/008 | 701/519 |
| 7,747,370 B2 * | 6/2010 | Dix | A01B 69/008 | 701/50 |
| 8,145,390 B2 * | 3/2012 | Dix | G05D 1/0278 | 701/538 |
| 10,754,342 B2 * | 8/2020 | Tomita | A01D 41/1278 | |
| 11,234,356 B2 * | 2/2022 | Nishii | G05D 1/0219 | |
| 2005/0273253 A1 * | 12/2005 | Diekhans | G01C 21/20 | 701/50 |
| 2005/0284119 A1 * | 12/2005 | Brunnert | A01B 69/008 | 56/6 |
| 2008/0103690 A1 * | 5/2008 | Dix | G05D 1/0278 | 701/50 |
| 2008/0103694 A1 * | 5/2008 | Dix | A01B 69/008 | 701/425 |
| 2008/0249692 A1 * | 10/2008 | Dix | A01B 69/008 | 701/50 |
| 2008/0269956 A1 * | 10/2008 | Dix | G05D 1/0278 | 701/1 |
| 2013/0238182 A1 * | 9/2013 | Osagawa | G05D 1/0278 | 701/26 |
| 2015/0319913 A1 * | 11/2015 | Foster | A01B 69/00 | 701/26 |
| 2016/0109885 A1 * | 4/2016 | Fujimoto | G05D 1/0219 | 701/23 |
| 2017/0322559 A1 * | 11/2017 | Fukuda | G05D 1/0246 | |
| 2018/0011495 A1 * | 1/2018 | Sakaguchi | G05D 1/0276 | |
| 2018/0024563 A1 * | 1/2018 | Matsuzaki | G05D 1/0214 | 701/41 |
| 2018/0113471 A1 * | 4/2018 | Sakaguchi | G05D 1/0219 | |
| 2018/0136664 A1 * | 5/2018 | Tomita | A01B 69/008 | |
| 2018/0206392 A1 * | 7/2018 | Matsuzaki | A01B 76/00 | |
| 2018/0310461 A1 * | 11/2018 | Shinkai | A01B 69/008 | |
| 2019/0146513 A1 * | 5/2019 | Tomita | B60W 30/10 | 701/50 |
| 2020/0288622 A1 * | 9/2020 | Nishii | A01B 69/00 | |
| 2022/0110239 A1 * | 4/2022 | Nishii | A01B 69/00 | |

\* cited by examiner

AUTOMATED DRIVING SYSTEM FOR WORK VEHICLE

CROSS-REFERENCE

This application is a U.S. National Stage Application under 35 U.S.C. § 371 of International Application No. PCT/JP2020/023850 filed Jun. 17, 2020, which claims foreign priority of JP2019-114954 filed Jun. 20, 2019, the disclosures of which are hereby incorporated by reference in their entirety.

TECHNICAL FIELD

The present invention relates to an automated driving system for a work vehicle, which enables automated driving of a work vehicle.

BACKGROUND ART

As such an automated driving system for a work vehicle as described above, there is one that is configured to control driving of a work vehicle based on a driving path that is generated in advance (see, for example, Patent Literature 1). Note that, for example, the driving path for making the work vehicle perform automated driving includes multiple work paths aligned in parallel at a predetermined interval and multiple turning paths that connect the multiple work paths in the driving order of the work vehicle.

CITATION LIST

Patent Literature

Patent Literature 1: Patent publication No. 6170185

DISCLOSURE OF INVENTION

Problems to be Solved by the Invention

Conventionally, in such an above-described automated driving system for a work vehicle, there has been a proposal that a control target position is set on the driving path, and the travel direction of the work vehicle is adjusted according to the difference (deviation amount) between the control target position and the driving path, so as to make the work vehicle perform automated driving according to the driving path. For setting the control target position in such an automated driving system, it is assumed that, when the work vehicle is located on a work path, the control target position is set on the work path or on an extension of the work path, and, when the work vehicle is located on a turning path, the control target position is set on the turning path or on an extension of the turning path. However, in a case where the control target position is set in this way, the turn-driving state is maintained until the work vehicle reaches the end point of a turning path, and thus, when the work vehicle shifts from the turning path to a work path, the posture of the work vehicle may not be appropriate for the work path. In such a case, for example, if the work site is an orchard or field in which fruit tree rows, crop rows, or the like that are adjacent to the work path exist, it is necessary to set the connection point of the work path and the turning path at a position that is greatly far from the end point of a fruit tree row, crop row, or the like, in order to prevent the work vehicle, which is in an inappropriate posture for the work path, from colliding with the fruit tree rows, crop rows, or the like that are adjacent to the work path. As a result, the non-work paths such as the turning paths included in the driving path for automated driving become longer, and thus there is a room for improvement in shortening the work time, reducing fuel consumption, etc.

That is, in order to enable automated driving of the work vehicle, it is extremely important to make the posture of the work vehicle at the end of turning be suitable for driving for work on work paths.

In view of this situation, a main subject of the present invention is to provide an automated driving system for a work vehicle whose posture at the time of shifting from a turning path to a work path can be set to be suitable for driving for work on the work path from an initial stage of the work vehicle shifting from the turning path to the work path.

Means for Solving the Problems

The automated driving system according to the present invention includes a position information obtainment part, which obtains position information of a work vehicle, and an automated driving control part, which makes the work vehicle perform automated driving according to a target path that is generated in advance, wherein the target path includes a plurality of work paths, which are aligned in parallel at a predetermined interval, and a plurality of turning paths, which connect the plurality of work paths in a driving order of the work vehicle, the automated driving control part sets a control target position, so as to thereby enable automated driving of the work vehicle according to the target path, the automated driving control part sets the control target position on an extension of the work path when the work vehicle is located on the work path in a vicinity of a boundary to the turning path, and the automated driving control part sets the control target position on the work path when the work vehicle is located on the turning path in a vicinity of a boundary to the work path.

According to the present invention, it is possible to provide an automated driving system for a work vehicle whose posture at the time of shifting from a turning path to a work path can be set to be suitable for driving for work on the work path from an initial stage of the work vehicle shifting from the turning path to the work path.

DESCRIPTION OF EMBODIMENTS

Hereinafter, as examples of a form for carrying out the present invention, an explanation based on the drawings will be given of embodiments in which an automated driving system for a work vehicle according to the present invention is applied to a work vehicle for an orchard whose work targets are fruit trees, such as grapes or apples that are planted so as to be aligned in multiple rows in an orchard such as a grape orchard or an apple orchard, the soil between fruit tree rows, etc.

Note that the automated driving system for a work vehicle according to the present invention can be applied to a work vehicle for a tea plantation whose work targets are tea trees that are planted side by side in multiple rows in a plantation other than an orchard such as a tea plantation, the soil between tea tree rows, etc., a work vehicle whose work targets are crops that are planted side by side in multiple rows in a field, the soil between crop rows, etc., a riding-type work vehicle that can preform automated driving such as a tractor, riding-type mower, riding-type rice transplanter, combine, snowplow, wheel loader, or haulage vehicle, and an unmanned work vehicle such as an unmanned tiller or an unmanned mower.

Figure 1:
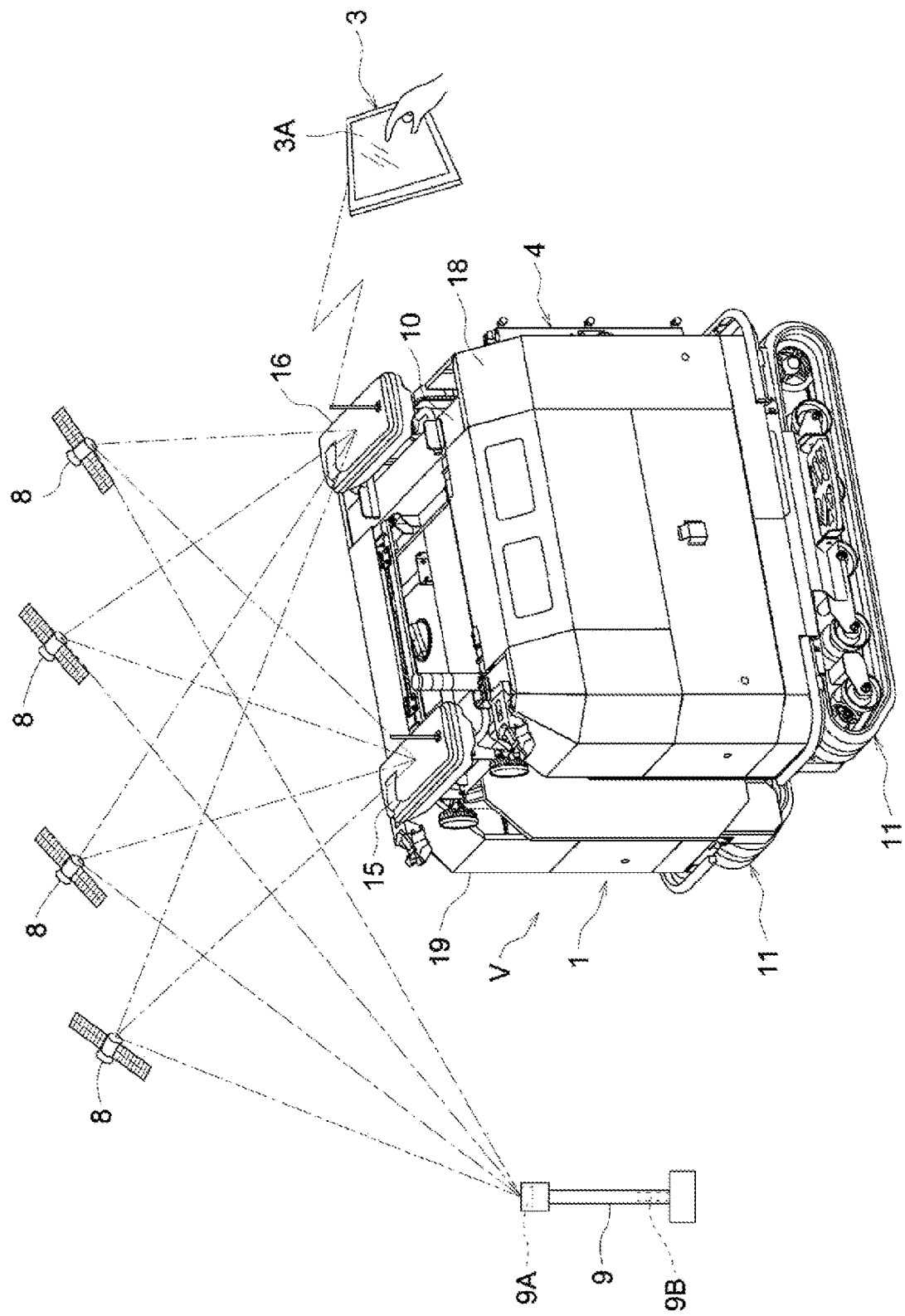
FIG. 1 is a diagram illustrating a schematic configuration of an automated driving system for a work vehicle.
Figure 2:
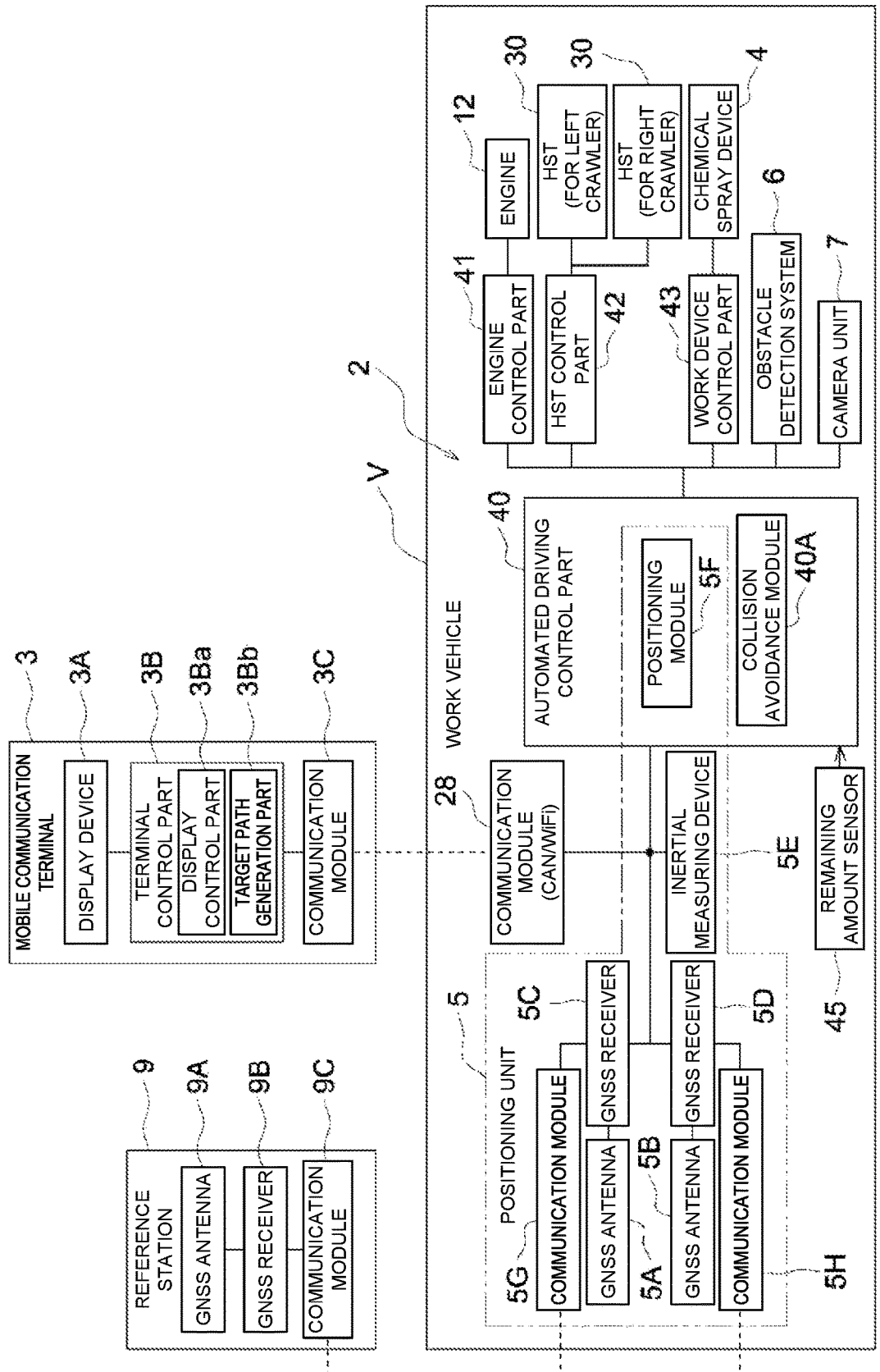
FIG. 2 is a block diagram illustrating the schematic configuration of the automated driving system for the work vehicle.

As illustrated in FIG. 1 to FIG. 2, it is possible for the work vehicle V for an orchard which is exemplified in the present embodiment to perform automated driving in an orchard, which is an example of a work site, by using an automated driving system for a work vehicle. The automated driving system for a work vehicle includes the automated driving unit 2 which is mounted on the vehicle body 1 of the work vehicle V, the mobile communication terminal 3 which is an example of a wireless communication device that is set to be capable of performing a wireless communication with the automated driving unit 2, etc. The mobile communication terminal 3 includes the multi-touch-type display device (for example, a liquid crystal panel) 3A, which enables displaying of various kinds of information related to automated driving, input operations, etc.

As illustrated in FIG. 1 to FIG. 8, the work vehicle V is equipped with the vehicle body 1 which has a gate shape so as to straddle fruit trees such as grapes or apples that are planted side by side in multiple rows in an orchard when driving, the spray device 4 which sprays spray liquid, such as a chemical or water, on fruit trees, the positioning unit (an example of the position information obtainment part) 5 which measures the current position, current direction, etc., of the vehicle body 1 by utilizing GNSS (Global Navigation Satellite System) which is an example of the satellite positioning system, the obstacle detection system (an example of the obstacle detection part) 6 which monitors the surroundings of the vehicle body 1 and detects an obstacle existing around the vehicle body 1, the camera unit 7 which captures images of the front side and rear side of the vehicle body 1, etc. The obstacle detection system 6 detects fruit trees or the like planted in an orchard as obstacles.

Note that, instead of or in addition to the spray device 4, it is possible that this work vehicle V is equipped with a work device such as a clipper-type plucking device (not illustrated in the drawings) that plucks branches and leaves of a fruit tree, a cultivator (not illustrated in the drawings) that performs weeding and crushing soil, etc., between fruit trees, and the like. The mobile communication terminal 3 can employ an HMI tablet, a smartphone, etc. For the wireless communication, a wireless LAN (Local Area Network) such as Wi-Fi®, a short-range wireless communication such as Bluetooth®, etc., can be employed.

As illustrated in FIG. 1 and FIG. 3 to FIG. 8, the vehicle body 1 has the vehicle body frame 10 which is formed in a gate shape in the front-rear direction view, and the left and right crawlers 11 which are connected to the left and right lower end parts of the vehicle body frame 10. On the left side section of the vehicle body 1, the engine 12, the battery 13, etc., are mounted. The right side section of the vehicle body 1 is equipped with the oil tank 14, which is made of a steel plate formed in a lateral L-shape, the storage tank (an example of the storage part) 4A of the spray device 4, etc. The ceiling part of the vehicle body 1 is equipped with the front antenna unit 15 which is arranged on the front side of the ceiling part, the rear antenna unit 16 which is arranged on the rear side of the ceiling part, the stacked indicator light 17 which indicates the driving status of the vehicle body 1, etc. The engine 12, the battery 13, etc., are covered with the left cover member 18 formed as an outer surface on the left side of the vehicle body 1. The oil tank 14, the storage tank 4A, etc., are covered with the right cover member 19 formed as an outer surface on the right side of the vehicle body 1.

As illustrated in FIG. 3 to FIG. 8, the vehicle body frame 10 has the left and right side frames 20 which are arranged in parallel with a predetermined distance in the left-right direction, the front cross member 21 which bridges the upper end parts on the front end side of the left and right side frames 20, the rear cross member 22 which bridges the upper end parts on the rear end side of the left and right side frames 20, etc. Accordingly, the vehicle body frame 10 is formed in a gate shape securely having a space for allowing fruit trees to pass through between the left and right side frames 20. To the left and right side frames 20, the inner wall members 23 formed as the left and right inner surfaces of the vehicle body 1 are attached, respectively.

As illustrated in FIG. 4 to FIG. 7, each of the side frames 20 has the base member 20A which extends in the front-rear direction of the vehicle body 1, the front columnar support member 20B which extends upward from the front end part of the base member 20A, the rear columnar support member 20C which extends upward from the rear end part of the base member 20A, the upper-side member 20D which bridges the upper end part of the front columnar support member 20B and the upper end part of the rear columnar support member 20C, etc. Accordingly, the left and right side frames 20 are formed in a rectangular shape in the left-right direction view.

Figure 4:
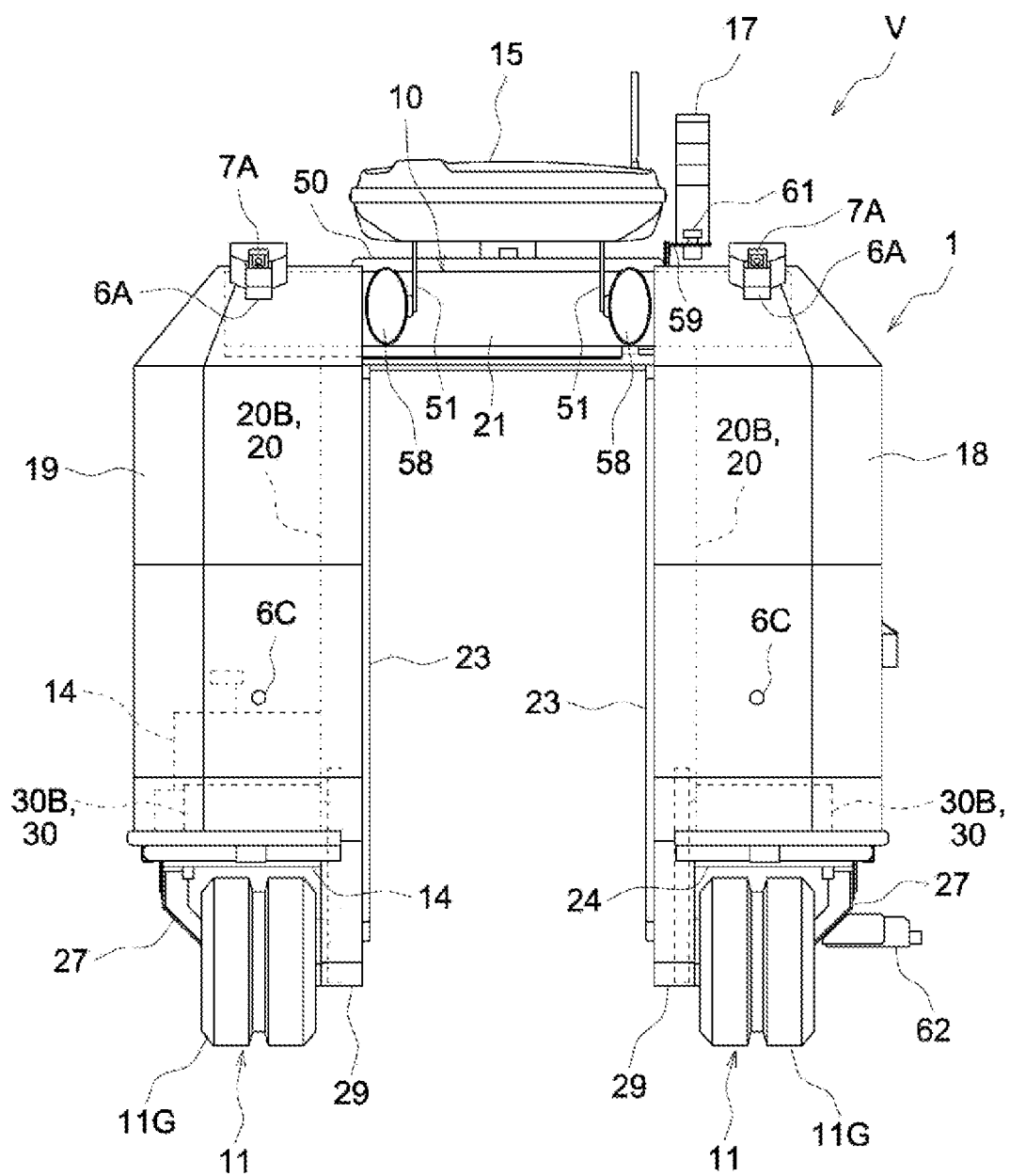
FIG. 4 is a front view illustrating the configuration of the work vehicle for an orchard.
Figure 5:
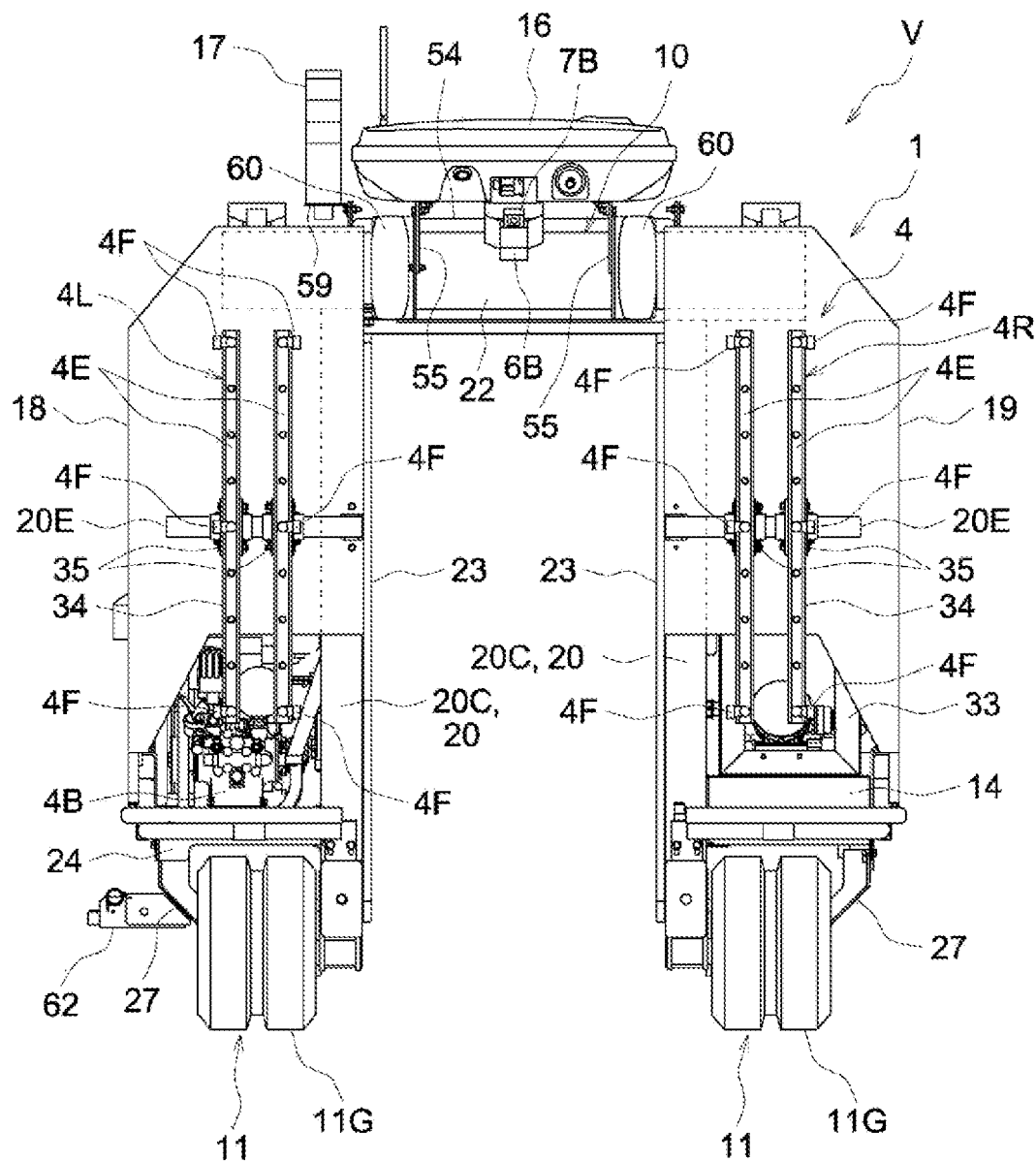
FIG. 5 is a rear view illustrating the configuration of the work vehicle for an orchard.
Figure 6:
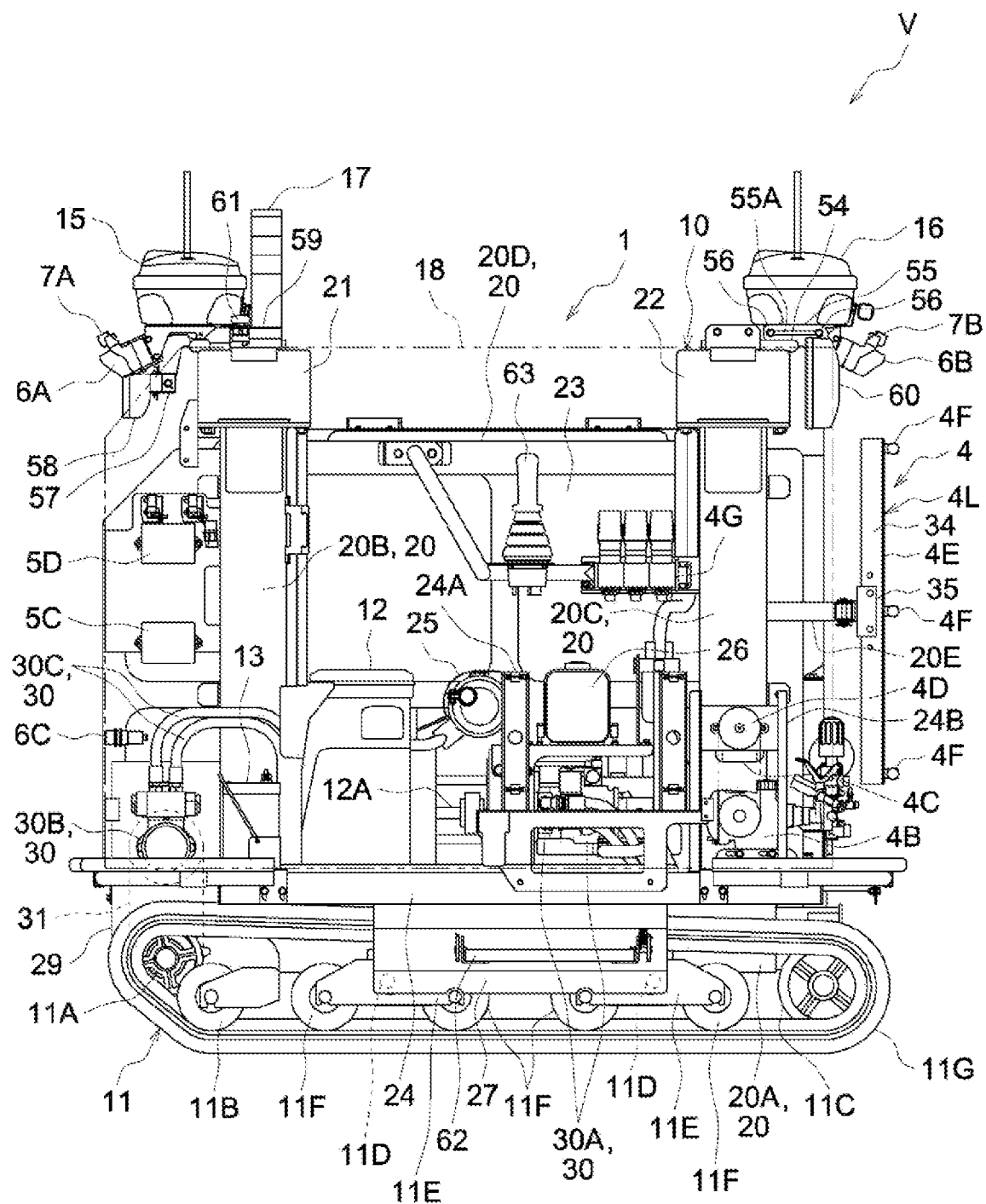
FIG. 6 is a right side view illustrating the configuration of the work vehicle for an orchard in a state where a left cover member is removed.

As illustrated in FIG. 3 to FIG. 6, of the left and right side frames 20, the left side frame 20 supports the mounting platform 24 on which the engine 12, the battery 13, etc., are mounted. The mounting platform 24 protrudes leftward from the lower part of the left side frame 20 so as to be arranged right above and in close proximity to the left crawler 11. As illustrated in FIG. 6, the mounting platform 24 is equipped with the first support part 24A that supports the muffler 25 and the fuel tank 26.

Figure 7:
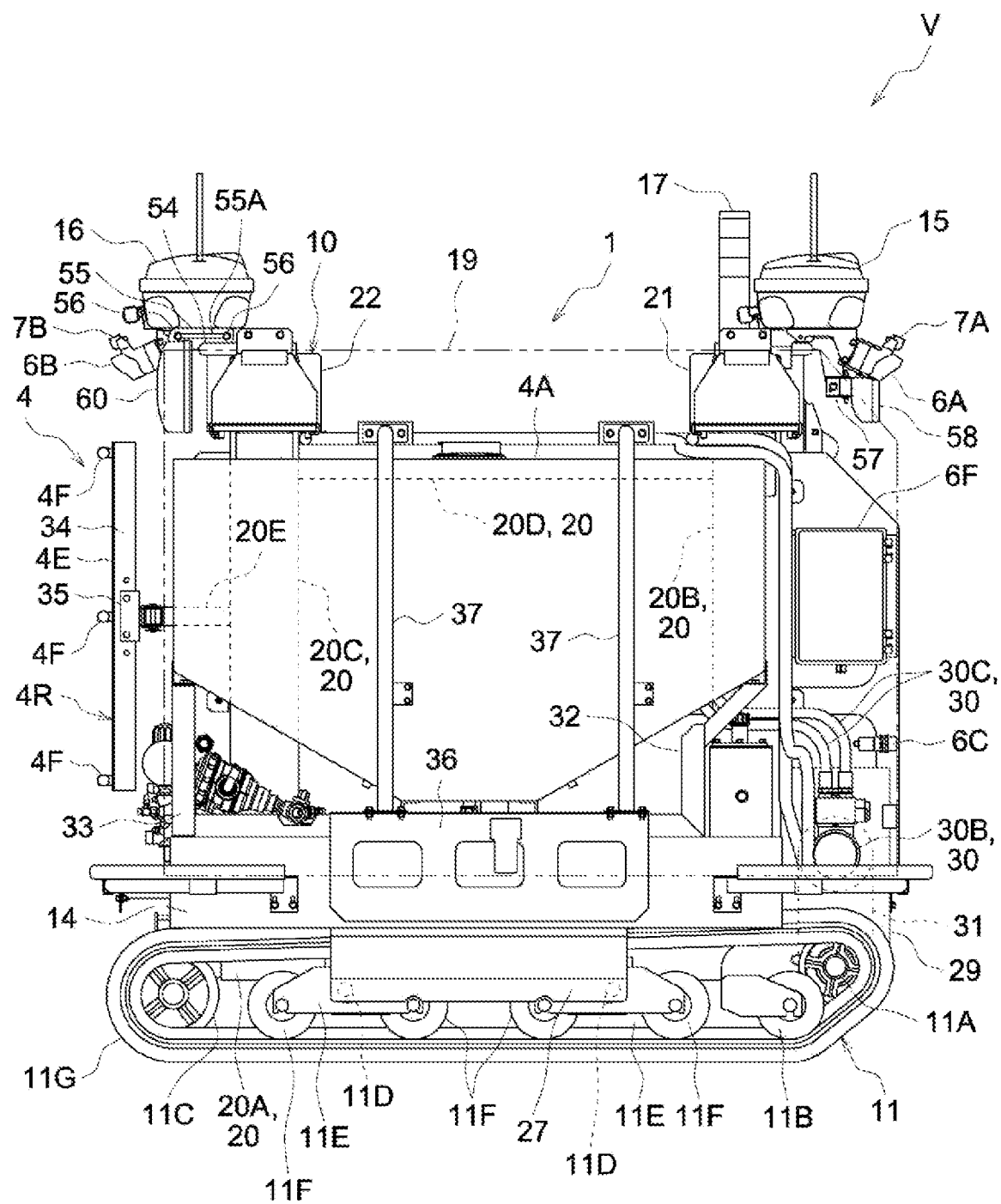
FIG. 7 is a left side view illustrating the configuration of the work vehicle for an orchard in a state where a right cover member is removed.

As illustrated in FIG. 4 to FIG. 5 and FIG. 7, the oil tank 14 which is in a state of extending rightward from the lower part of the right side frame 20 is connected to the right side frame 20. Accordingly, the oil tank 14 is arranged right above and in close proximity to the right crawler 11.

That is, in this work vehicle V, the engine 12 and the battery 13, which are heavy, and the oil tank 14, which is heavy when storing oil, etc., are respectively arranged on the left and right sides in the lower part of the vehicle body 1. Accordingly, this work vehicle V is designed to have a low center of gravity in a left-right balanced state. As a result, it is possible for the work vehicle V to stably perform contour driving, etc. on a slope in an orchard.

Figure 3:
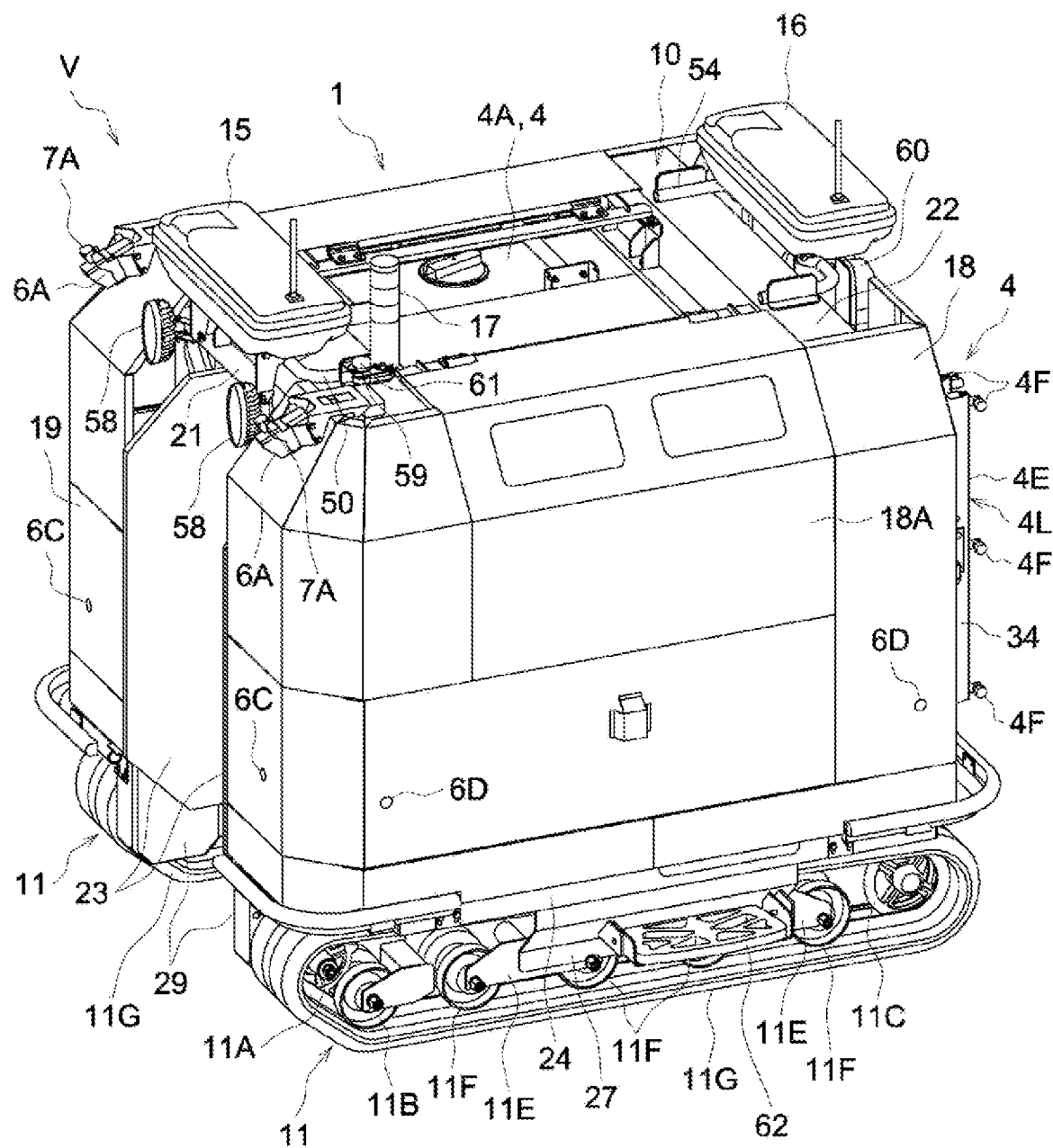
FIG. 3 is a perspective view illustrating a configuration of the work vehicle for an orchard.

As illustrated in FIG. 3 and FIG. 6 to FIG. 7, the base members 20A of the side frames 20 are also used as the track frames of the left and right crawlers 11. In each of the left and right crawlers 11, the drive sprocket 11A and the first road wheel 11B are supported in a rotatable manner at the front end part of the track frame (base member) 20A. In the rear end part of the track frame 20A, the idler wheel 11C for tensioning is supported so as to be displaceable in the front-rear direction. The middle part of the track frame 20A with respect to the front-rear direction is equipped with the front and rear equalizer arms 11E which pivotally swing in the up-down direction with the front and rear support shafts 11D extending in the laterally outward direction from the track frame 20A. The second road wheels 11F are supported in a rotatable manner at the front and rear idler end parts in each of the equalizer arms 11E. That is, the four second road wheels 11F are supported at the middle part of the track frame 20A with respect to the front-rear direction so as to be swingable/displaceable in the up-down direction. The crawler belt 11G is wrapped around the drive sprocket 11A, each of the road wheels 11B and 11F, and the idler wheel 11C. The rear part of the track frame 20A is equipped with a tensioning mechanism (not illustrated in the drawings) that biases the idler wheel 11C to displace rearward so as to maintain the crawler belt 11G in a tensioned state.

As illustrated in FIG. 3 to FIG. 6, in the left crawler 11, the left end parts of the front and rear support shafts 11D are connected to the left end part of the mounting platform 24 via the left support plate 27. As illustrated in FIG. 4 to FIG. 5 and FIG. 7, in the right crawler 11, the right end parts of the front and rear support shafts 11D are connected to the right end part of the oil tank 14 via the right support plate 27. That is, in this work vehicle V, the vehicle body frame 10 and the left and right crawlers 11 are configured as an integrated structure.

As illustrated in FIG. 4 and FIG. 6 to FIG. 7, the power from the engine 12 is transmitted to the drive sprockets 11A of the respective crawlers 11 via the pair of hydro-static continuously-variable transmissions (hereinafter referred to as HSTs) 30 and the left and right chain-type power-transmission device 31. Each HST 30 employs a separate-type HST having the hydraulic pump 30A of a variable displacement and axial plunger type, the hydraulic motor 30B of a fixed displacement and axial plunger type, the multiple hydraulic pipes 30C connecting the hydraulic pump 30A and the hydraulic motor 30B, etc.

With the above-described configuration, the left and right crawlers 11 are driven by the power from the engine 12 in a state where independent gear change can be performed with the corresponding HSTs 30. Accordingly, this vehicle body 1 is turned into the forward-traveling state when the left and right crawlers 11 are driven at an even speed in the forward-traveling direction so that the vehicle body 1 travels straight in the forward-traveling direction and is turned into the rearward-traveling state when the left and right crawlers 11 are driven at an even speed in the rearward-traveling direction so that the vehicle body 1 travels straight in the rearward-traveling direction. The vehicle body 1 is turned into the forward-traveling turning state when the left and right crawlers 11 are driven at uneven speeds in the forward-traveling direction so that the vehicle body 1 makes a gentle turn while traveling forward and is turned into the rearward-traveling turning state when the left and right crawlers 11 are driven at uneven speeds in the rearward-traveling direction so that the vehicle body 1 makes a gentle turn while traveling rearward. The vehicle body 1 is turned into the pivot turning state when driving of either one of the left and right crawlers 11 is stopped while the other crawler 11 is driven and is turned into the spin turning state when the left and right crawlers 11 are driven at an even speed in the forward-traveling direction and the backward-traveling direction. The vehicle body 1 is turned into the driving-stopped state when the driving of the left and right crawlers 11 is stopped.

Note that it is also possible that the left and right crawlers 11 are configured as an electric type in which the drive sprockets 11A thereof are driven by left and right electric motors.

As illustrated in FIG. 6, the hydraulic pump 30A of each HST 30 is of a double type, which is driven by a single pump shaft (not illustrated in the drawings) directly connected to the output shaft 12A of the engine 12. The double hydraulic pump 30A is mounted on the mounting platform 24 so as to be located right below the fuel tank 26. As illustrated in FIG. 3 to FIG. 4 and FIG. 6 to FIG. 7, the left and right hydraulic motors 30B are attached to the upper part of the power-transmission case 29, which is connected to a lower part of the front end of each side frame 20. Each of the hydraulic pipes 30C is installed along the vehicle body frame 10. Inside the corresponding power-transmission cases 29, the left and right chain-type power-transmission devices 31 transmit power from output shafts (not illustrated in the drawings) of the hydraulic motors 30B to drive shafts (not illustrated in the drawings) which integrally rotate together with the drive sprockets 11A of the crawlers 11.

As illustrated in FIG. 3 and FIG. 5 to FIG. 8, the spray device 4 has the storage tank 4A that stores a chemical or the like, the spray pump 4B that transfers a chemical or the like with a pressure, the electric spray motor 4C that drives the spray pump 4B, the belt-type power-transmission device 4D that transmits power from the spray motor 4C to the spray pump 4B, the spray pipes 4E of which two pipes are arranged in parallel in a vertical posture on each of the left and right sides at the rear part of the vehicle body 1, the total of twelve spray nozzles 4F of which three nozzles are arranged on each spray pipe 4E, the electronically-controlled valve unit 4G which changes the spraying amount and spraying pattern of a chemical or the like, multiple pipes for spraying (not illustrated in the drawings) that connect the above-mentioned components, etc.

The storage tank 4A is supported by the oil tank 14 via the front and rear support frames 32 and 33, which are arranged on the upper surface of the oil tank 14. The spray pump 4B is mounted at the rear part of the mounting platform 24. The spray motor 4C is supported by the second support part 24B, which is arranged at the rear part of the mounting platform 24. The spray motor 4C is arranged right above the spray pump 4B. The two spray pipes 4E on the left side are respectively attached to the support member 20E, which is in an L-shape in plan view and is arranged on the left side frame 20, via the pipe holder 34 that extends in the up-down direction and the bracket 35 that is connected to the middle part of the pipe holder 34 with respect to the up-down direction. The two spray pipes 4E on the right side are respectively attached to the support member 20E, which is in an L-shape in plan view and is arranged on the right side frame 20, via the pipe holder 34 that extends in the up-down direction and the bracket 35 that is connected to the middle part of the pipe holder 34 with respect to the up-down direction.

Each spray nozzle 4F is attached to the corresponding spray pipe 4E so as to be repositionable in the up-down direction. Accordingly, the respective spray nozzles 4F can change their vertical spacing and their height positions relative to the spray pipes 4E according to the spraying targets. Each pipe holder 34 is connected via a pin to the corresponding bracket 35 so as to be repositionable in the up-down direction. Accordingly, the respective spray nozzles 4F can change their height positions relative to the vehicle body 1 for each pipe holder 34 according to the spraying targets. Each bracket 35 is connected via a pin to the corresponding support member 20E so as to be repositionable in the left-right direction. Accordingly, the respective spray nozzles 4F can change their left-right positions relative to the vehicle body 1 for each bracket 35 according to the spraying targets.

Note that, in the spray device 4, the number of spray nozzles 4F arranged for each spray pipe 4E can be changed in various ways according to the type of fruit trees, the length of each spray pipe 4E, etc.

As illustrated in FIG. 3 and FIG. 5 to FIG. 9, of the respective spray nozzles 4F, the three spray nozzles 4F arranged for the leftmost spray pipe 4E spray a chemical or the like in a leftward direction toward the fruit trees Z located on the left outer side of the vehicle body 1. Of the respective spray nozzles 4F, the three spray nozzles 4F arranged for the middle-left spray pipe 4E, which is adjacent to the leftmost spray pipe 4E, spray a chemical or the like in a rightward direction toward the fruit trees Z located in the central space of the vehicle body 1 with respect to the left-right direction. Of the respective spray nozzles 4F, the three spray nozzles 4F arranged for the rightmost spray pipe 4E spray a chemical or the like in a rightward direction toward the fruit trees Z located on the right outer side of the vehicle body 1. Of the respective spray nozzles 4F, the three spray nozzles 4F arranged for the middle-right spray pipe 4E, which is adjacent to the rightmost spray pipe 4E, spray a chemical or the like in a leftward direction toward the fruit trees Z located in the central space of the vehicle body 1 with respect to the left-right direction.

With the above-described configuration, in this spray device 4, the two spray pipes 4E and the six spray nozzles 4F arranged at the rear part on the left side of the vehicle body 1 function as the left liquid spray part 4L (an example of the work part). Further, the two spray pipes 4E and the six spray nozzles 4F arranged at the rear part on the right side of the vehicle body 1 function as the right liquid spray part (an example of the work part) 4R. Further, the left and right liquid spray parts 4L and 4R are arranged at the rear part of the vehicle body 1 in a state of being able to perform spraying in the left and right directions, so as to have a distance between the left and right liquid spray parts 4L and 4R in the left-right direction for allowing the fruit trees Z to pass through.

In the spray device 4, the spraying patterns of the left and right liquid spray parts 4L and 4R include the four-direction spraying pattern, in which the left and right respective liquid spray parts 4L and 4R spray in both left and right directions, and the direction-limited spraying pattern, in which the spraying directions of the left and right liquid spray parts 4L and 4R are limited. The direction-limited spraying pattern includes the left-side three-direction spraying pattern, in which the left liquid spray part 4L sprays in both left and right directions and the right liquid spray part 4R sprays only in the left direction, the right-side three-direction spraying pattern, in which the left liquid spray part 4L sprays only in the right direction and the right liquid spray part 4R sprays in both left and right directions, and the two-direction spraying pattern, in which the left liquid spray part 4L sprays only in the right direction and the right liquid spray part 4R sprays only in the left direction.

As illustrated in FIG. 7, the left end part of the oil tank 14 is supported by the base member 20A of the right side frame 20. The support plate 36 is connected to the right end part of the oil tank 14. The upper end part of the support plate 36 is connected to the upper-side member 20D of the right side frame 20 via the front and rear support members 37. Accordingly, the right end part of the oil tank 14 is supported by the upper-side member 20D of the right side frame 20 via the support plate 36 and the front and rear support members 37.

That is, since both left and right end parts of the oil tank 14 are respectively supported by the right side frame 20, the oil tank 14 has a support strength which is high enough to be used as a mounting platform on which the storage tank 4A is mounted. Note that the shape of the oil tank 14 in plan view is left-right reversal of the shape of the mounting platform 24 in plan view.

As illustrated in FIG. 2, the vehicle body 1 is equipped with the automated driving control part 40 which makes the vehicle body 1 perform automated driving according to the target path P (see FIG. 9) in an orchard based on positioning information or the like obtained from the positioning unit 5, the engine control part 41 which performs control related to the engine 12, the HST control part 42 which performs control related to each HST 30, the work device control part 43 which performs control related to a work device such as the spray device 4, etc. Each of the control parts 40 to 43 is structured with an electronic control unit on which a microcontroller or the like is mounted, various kinds of information and control programs stored in a non-volatile memory (e.g., an EEPROM such as a flash memory) of the microcontroller, etc. The various kinds of information stored in the non-volatile memory includes the target path P which is generated in advance according to the orchard of the work target, etc.

The respective control parts 40 to 43 are connected in a mutually communicable manner via CAN (Controller Area Network), which is an example of an in-vehicle network. For example, in-vehicle Ethernet, CAN-FD (CAN with Flexible Data rate), or the like may be employed as the in-vehicle network.

Figure 9:
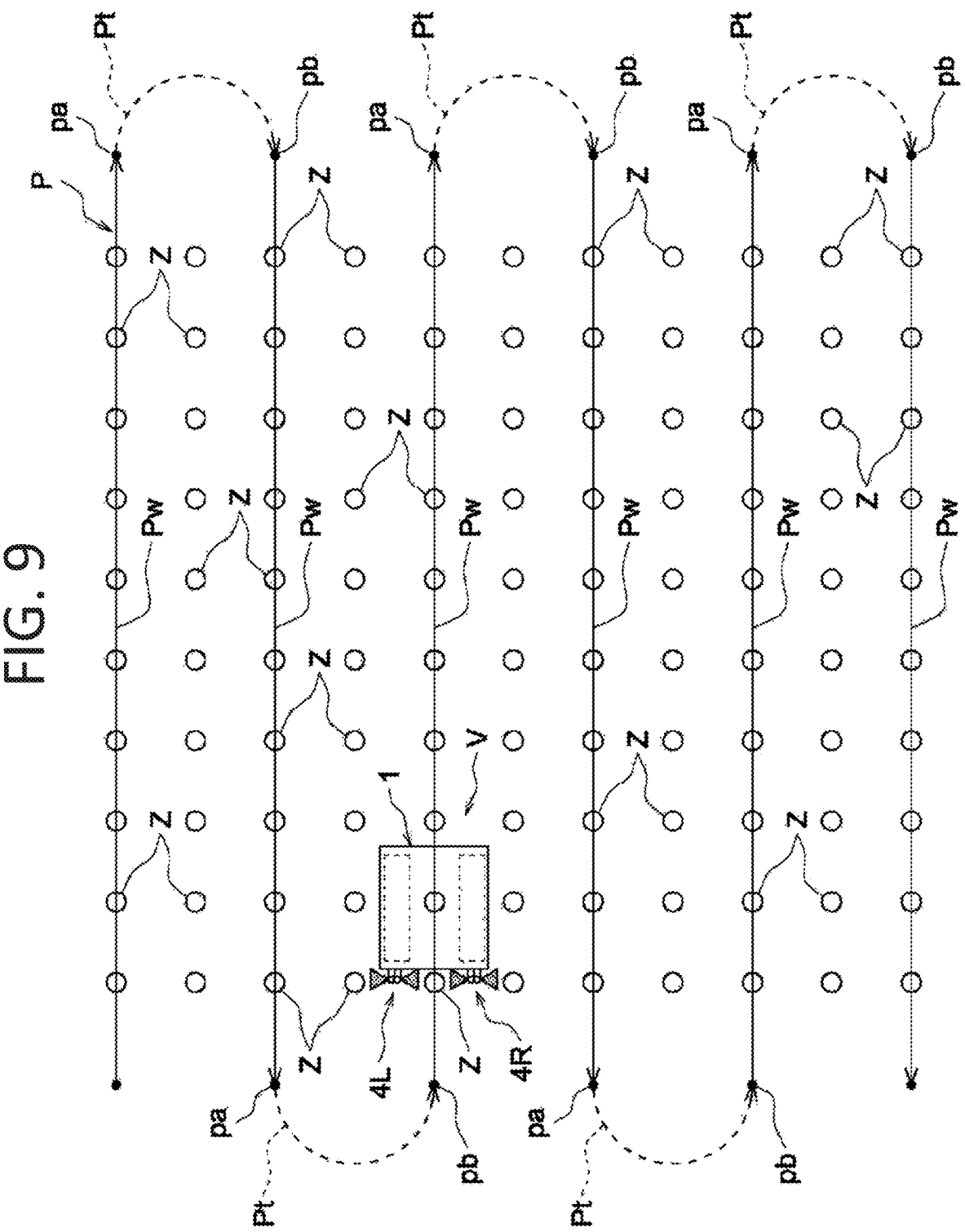
FIG. 9 is a plan view illustrating an example of a target path for an orchard.
Figure 10:
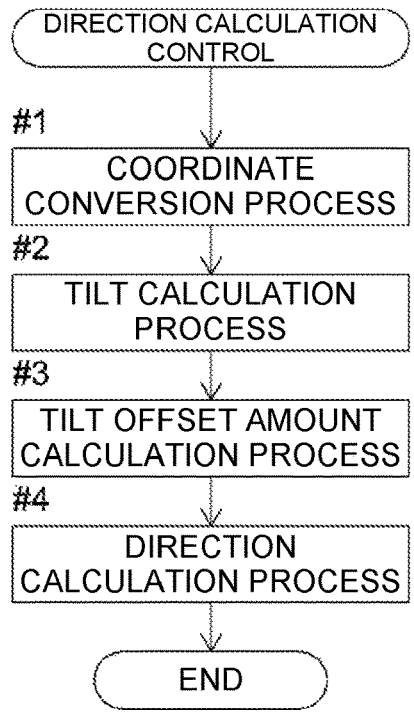
FIG. 10 is a flowchart of direction calculation control.
Figure 11:
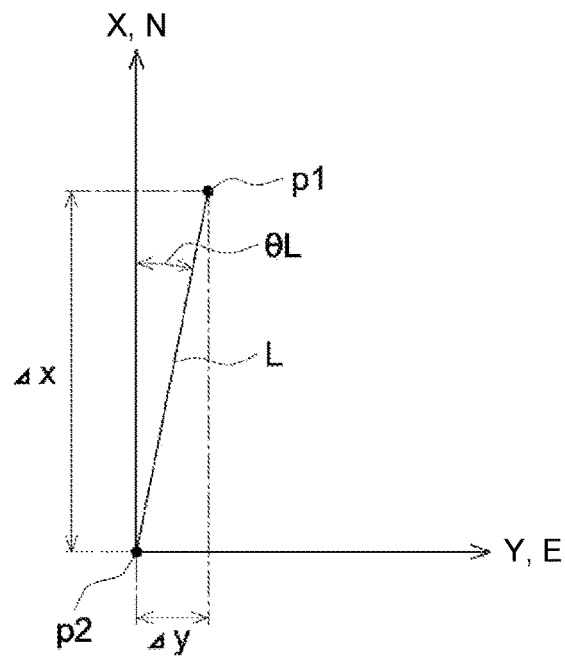
FIG. 11 is an explanatory diagram of a tilt calculation process.
Figure 12:
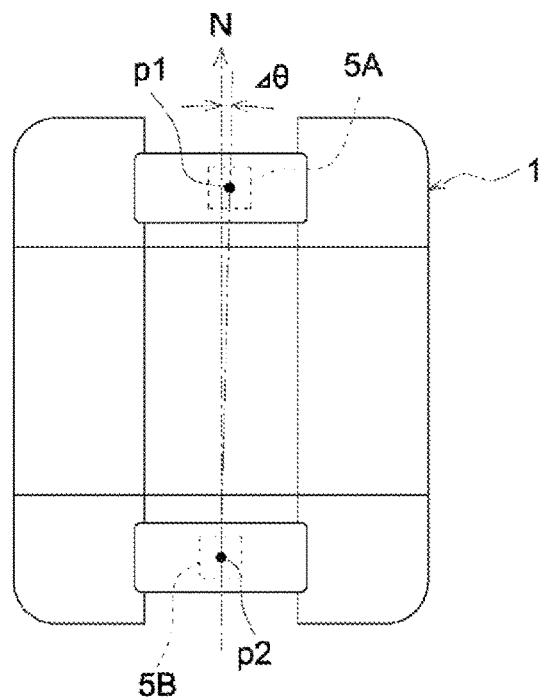
FIG. 12 is an explanatory diagram of a tilt offset amount calculation process.
Figure 13:
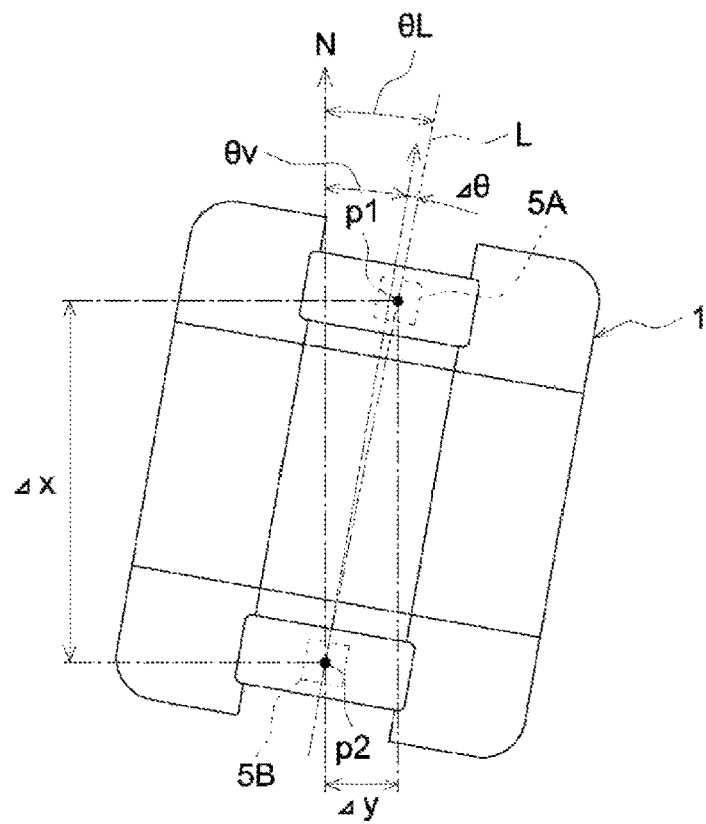
FIG. 13 is an explanatory diagram of a direction calculation process.

As illustrated in FIG. 9, the target path P includes the multiple work paths Pw arranged in parallel at predetermined intervals and the multiple turning paths Pt that connect the multiple work paths Pw in the driving order of the work vehicle V. Each of the work paths Pw is a path on which the work vehicle V performs driving while performing a work on the fruit trees Z that are planted side by side in multiple rows. Each of the turning paths Pt is a path on which the work vehicle V performs turn-driving without performing a work. The target path P includes various kinds of information related to automated driving, such as the driving direction, set vehicle speed, driving state, working state, etc., of the vehicle body 1 in each of the paths Pw and Pt.

Note that, in each work path Pw, the vehicle speed thereof is set to a relatively high speed (work speed) since the respective work paths Pw are straight paths or approximately straight paths corresponding to the fruit trees Z that are planted side by side in multiple rows. Further, in each turning path Pt, the vehicle speed is set to a lower speed (turning speed) than the vehicle speed on the work paths Pw, in order to prevent the work vehicle V from deviating from the turning path Pt.

Note that the target path P illustrated in FIG. 9 is merely an example, and the target path P can be changed in various ways according to vehicle information such as the type of work device included in the vehicle body 1 and the form of work, work site information such as the arrangement state and the number of rows of fruit trees Z which vary in each orchard, etc.

As illustrated in FIG. 2, the mobile communication terminal 3 is equipped with the terminal control part 3B that performs control related to the display device 3A, etc. The terminal control part 3B is structured with an electronic control unit on which a microcontroller or the like is mounted, various kinds of information and control programs stored in a non-volatile memory (e.g., an EEPROM such as a flash memory) of the microcontroller, etc. The terminal control part 3B includes the display control part 3Ba which controls the display device 3A in relation to a display or notification, the target path generation part 3Bb which generates the target path P (see FIG. 9) for enabling the work vehicle V to perform automated driving in an orchard in which the fruit trees Z are arranged side by side in multiple rows, etc. The display control part 3Ba and the target path generation part 3Bb are structured with various kinds of control programs, etc., which are stored in a non-volatile memory of the terminal control part 3B. The various kinds of information stored in the non-volatile memory includes work site information, the target path P (see FIG. 9), etc. Accordingly, it is possible to display the work site information, the target path P, etc., on the display device 3A of the mobile communication terminal 3.

The vehicle body 1 and the mobile communication terminal 3 are equipped with the communication modules 28 and 3C that enable a wireless communication between the automated driving control part 40 and the terminal control part 3B. In a case where Wi-Fi is employed for the wireless communication with the mobile communication terminal 3, the communication module 28 of the vehicle body 1 functions as a converter that converts communication information bidirectionally for CAN and Wi-Fi. The terminal control part 3B can obtain various kinds of information related to the vehicle body 1, which include the current position, current direction, etc., of the vehicle body 1, via the wireless communication with the automated driving control part 40. Accordingly, various kinds of information including the current position, current direction, etc., of the vehicle body 1 relative to the target path P can be displayed on the display device 3A of the mobile communication terminal 3.

Figure 8:
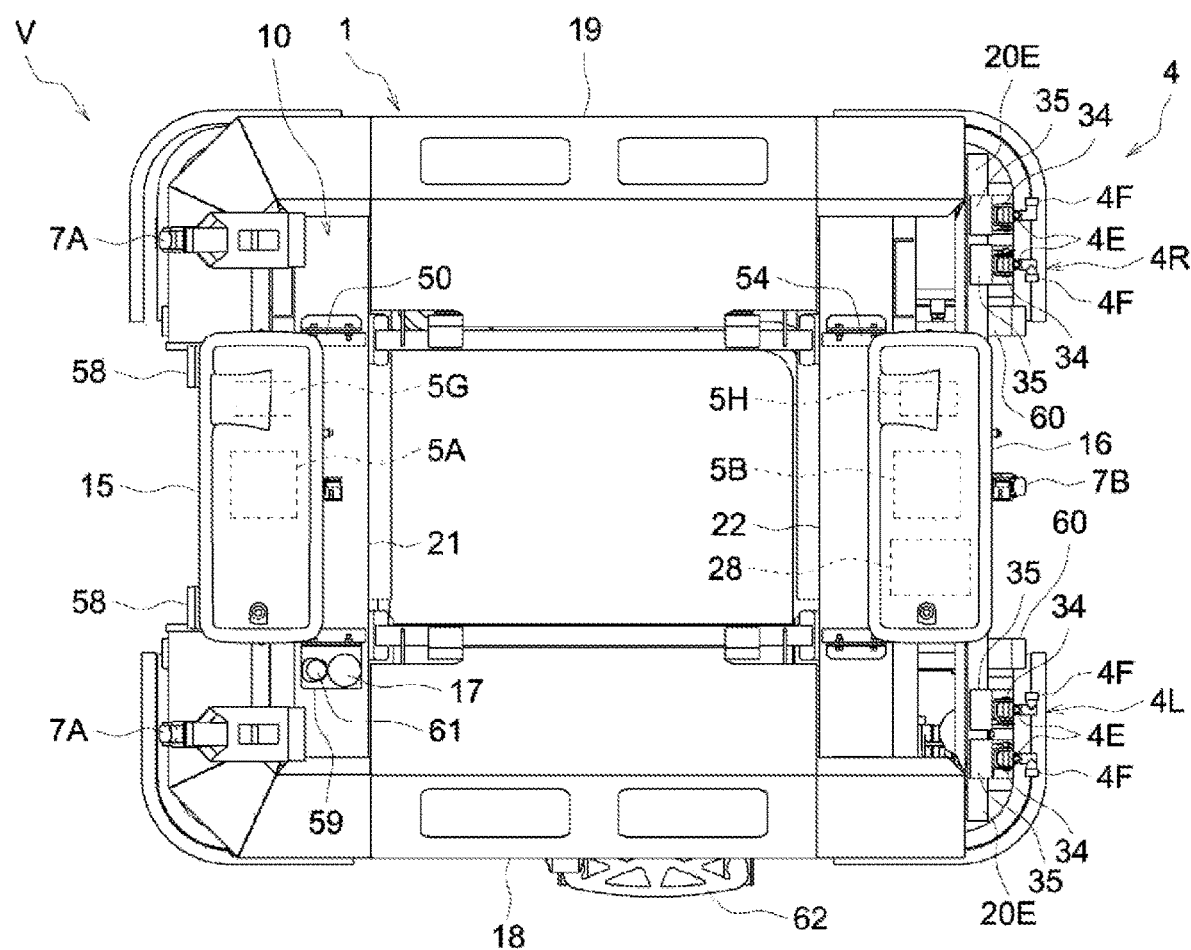
FIG. 8 is a plan view illustrating the configuration of the working vehicle for an orchard.

As illustrated in FIG. 2 and FIG. 8, the positioning unit 5 includes the two GNSS antennas 5A and 5B which receive radio waves transmitted from multiple positioning satellites 8 (see FIG. 1), the two GNSS receivers 5C and 5D which utilize the radio waves received by the respective GNSS antennas 5A and 5B to measure the positions of the respective GNSS antennas 5A and 5B (hereinafter may be simply referred to as the antenna positions), the inertial measuring device (IMU: inertial measurement unit) 5E which measures the posture, direction, etc., of the vehicle body 1, the positioning module 5F which calculates the current position, current direction, etc., of the vehicle body 1 based on position information obtained from the respective GNSS receivers 5C and 5D and measurement information obtained from the inertial measuring device 5E, etc.

The respective GNSS receivers 5C and 5D and the inertial measuring device 5E are connected to the automated driving control part 40 so as to be capable of performing mutual communication via CAN. The inertial measuring device 5E has a three-axis gyroscope, a three-direction acceleration sensor, etc. The positioning module 5F is structured with a control program for positioning, etc., which is stored in a non-volatile memory of the automated driving control part 40.

As positioning methods using GNSS, DGNSS (Differential GNSS), RTK-GNSS (Real Time Kinematic GNSS), etc., can be used. In the present embodiment, RTK-GNSS, which has high accuracy and is suitable for measurement of a movable object, is employed. Accordingly, the reference station 9, which enables positioning by RTK-GNSS, is installed at a known location in the periphery of the orchard.

As illustrated in FIG. 1 to FIG. 2, the reference station 9 is equipped with the GNSS antenna 9A which receives radio waves transmitted from the multiple positioning satellites 8, and the GNSS receiver 9B which utilizes the radio waves received by the GNSS antenna 9A to measure the position of the GNSS antenna 9A (hereinafter may be simply referred to as the antenna position). The GNSS receiver 9B obtains position correction information based on the measured antenna position and the installation position of the reference station 9. The positioning unit 5 and the reference station 9 are equipped with the communication modules 5G, 5H, and 9C which enable a wireless communication between the respective GNSS receivers 5C and 5D of the positioning unit 5 and the GNSS receiver 9B of the reference station 9. Accordingly, each of the GNSS receivers 5C and 5D of the positioning unit 5 can receive position correction information from the GNSS receiver 9B of the reference station 9.

Each of the GNSS receivers 5C and 5D of the positioning unit 5 corrects each antenna position measured by itself, based on the position correction information obtained from the GNSS receiver 9B of the reference station 9. Accordingly, each of the GNSS receivers 5C and 5D can measure the position (latitude, longitude, and altitude in the global coordinate system) of each of the GNSS antennas 5A and 5B with high accuracy. The positioning unit 5 has the GNSS receivers 5C and 5D and the inertial measuring device 5E, so that the inertial measuring device 5E can supplement a decrease in positioning accuracy of the GNSS receivers 5C and 5D, which is caused by deterioration of the surrounding environment. The positioning unit 5 can correct the measurement error, which is accumulated in the inertial measuring device 5E, based on the antenna positions measured by the GNSS receivers 5C and 5D. Although the respective GNSS antennas 5A and 5B are arranged at the top part of the vehicle body 1 so as to increase the reception sensitivity of the respective GNSS antennas 5A and 5B, the positional deviation of the respective antenna positions in the left-right direction of the vehicle body relative to the target path P, which is caused by rolling of the vehicle body 1, can be corrected by the positioning unit 5, based on the installation height of the respective GNSS antennas 5A and 5B and the roll angle of the vehicle body 1, which is measured by the inertial measuring device 5E. Accordingly, the current position, current direction, and attitude angles (yaw angle, roll angle, and pitch angle) of the vehicle body 1 can be measured by the positioning unit 5 with high accuracy.

As illustrated in FIG. 8, the respective GNSS antennas 5A and 5B of the positioning unit 5 are installed in a separated manner at front and rear two positions in the ceiling part of the vehicle body 1 at a predetermined distance in the front-rear direction of the vehicle body. The height positions of the front and rear GNSS antennas 5A and 5B are set to the same height. Of the front and rear GNSS antennas 5A and 5B, the front GNSS antenna 5A is included in the front antenna unit 15 together with the communication module 5G, etc., which are connected to the GNSS receiver 5C corresponding to the front GNSS antenna 5A. The rear GNSS antenna 5B is included in the rear antenna unit 16 together with the communication module 511 which is connected to the GNSS receiver 5D corresponding to this rear GNSS antenna 5B, the inertial measuring device 5E, the communication module 28 corresponding to the mobile communication terminal 3, etc. The positional relationship between the antennas of the front and rear GNSS antennas 5A and 5B and the installation height are stored in a non-volatile memory of the automated driving control part 40.

The positioning module 5F basically calculates the current position of the vehicle body 1 based on the rear antenna position measured by the rear GNSS receiver 5D of the front and rear antenna positions measured by the front and rear GNSS receivers 5C and 5D. In a case where only the positioning accuracy of the rear GNSS receiver 5D is reduced, the positioning module 5F calculates the current position of the vehicle body 1 based on the front antenna position measured by the front GNSS receiver 5C. Accordingly, the positioning module 5F can calculate the current position of the vehicle body 1 with high accuracy. Further, the automated driving control part 40 can make the work vehicle V perform automated driving according to the target path P, based on the highly accurate current position of the vehicle body 1, etc., which are calculated by the positioning module 5F.

For example, the current position of the vehicle body 1 calculated by the positioning module 5F can be set in a variety of ways, such as to the front end position at the center with respect to the left-right direction on the upper end of the vehicle body 1, the rear end position at the center with respect to the left-right direction on the upper end of the vehicle body 1, the middle position with respect to the front-rear direction at the center with respect to the left-right direction on the upper end of the vehicle body 1, the central position of the vehicle body 1, the position at the center of gravity of the vehicle body 1, the central position of turning in a spin-turning state, etc.

The positioning module 5F executes the direction calculation control in which the current direction of the vehicle body 1 is calculated based on the front and rear antenna positions measured by the front and rear GNSS receivers 5C and 5D.

As an explanation of the control operation of the positioning module 5F in the direction calculation control based on the flowchart of FIG. 10 and FIG. 11 to FIG. 13, the positioning module 5F firstly performs the coordinate conversion process (Step #1) in which the front and rear antenna positions p1 and p2 that are measured by the GNSS receivers 5C and 5D, respectively, are converted into the NED coordinate system where either one of the front and rear antenna positions (here, the rear antenna position p2) is the origin. Next, the positioning module 5F performs the tilt calculation process (Step #2, see FIG. 11) in which the tilt θL of the straight line L connecting the antennas is calculated with the X-axis (north: N) being 0 degrees, based on the difference Δx in the X-direction and the difference Δy in the Y-direction of the front antenna position p1 relative to the rear antenna position p2 in the NED coordinate system. Further, the positioning module 5F performs the tilt offset amount calculation process (Step #3, see FIG. 12) in which the tilt offset amount Δθ between the antennas in a case where the vehicle body 1 is facing true north (N) is calculated based on the positional relationship between the front and rear GNSS antennas 5A and 5B, which is stored in a non-volatile memory of the automated driving control part 40. Then, the positioning module 5F performs the direction calculation process (Step #4, see FIG. 13) in which the direction θv of the vehicle body 1 is calculated based on the difference between the tilt θL of the straight line L, which is obtained in the tilt calculation process, and the tilt offset amount Δθ between the antennas, which is obtained in the tilt offset amount calculation process.

In other words, in this work vehicle V, the positioning module 5F calculates the current direction of the vehicle body 1 based on the front and rear antenna positions, so that, unlike the case where the current direction of the vehicle body 1 is calculated based on a single antenna position, it is not necessary to calculate movement vectors of the vehicle body 1 in the process of calculating the current direction. Therefore, the current direction of the vehicle body 1 can be calculated with high accuracy even at the time of turning driving with a small turning radius, where it is difficult to calculate movement vectors of the vehicle body 1, and at the time where the driving of the vehicle body 1 is stopped, where movement vectors of the vehicle body 1 cannot be calculated.

In a case where the start of automated driving is commanded by a user's touch operation on the display device 3A of the mobile communication terminal 3, the automated driving control part 40 executes the automated driving control for making the vehicle body 1 (work vehicle V) perform automated driving according to the target path P, based on the target path P for spraying work which is stored in a non-volatile memory, positioning information which is obtained from the positioning module 5F, etc.

The automated driving control includes the command process for the engine, in which a control command related to the engine 12 is transmitted to the engine control part 41, the command process for an HST, in which a control command related to the HST 30 is transmitted to the HST control part 42, the command process for work, in which a control command related to the spray device 4 is transmitted to the work device control part 43, etc.

In the command process for the engine, the automated driving control part 40 transmits, to the engine control part 46A, an engine rotational speed changing command, etc., as an instruction for changing the engine rotational speed, based on the set engine rotational speed included in the target path P. The engine control part 46A executes the engine rotational speed control, etc., for changing the engine rotational speed in response to an engine rotational speed changing command transmitted from the automated driving control part 46F.

In the command process for an HST, the automated driving control part 40 transmits, to the HST control part 42, a driving state switching command as an instruction for switching the driving states based on the driving state of the vehicle body 1 which is included in the target path P, a vehicle speed changing command as an instruction for changing the vehicle speed based on the set vehicle speed which is included in the target path P, etc. The HST control part 42 executes the driving state switching control for controlling the operation of each HST 30 in response to a driving state switching command which is transmitted from the automated driving control part 40, a vehicle speed control for controlling the operation of each HST 30 in response to a vehicle speed changing command which is transmitted from the automated driving control part 40, etc.

In the command process for work, the automated driving control part 40 transmits, to the work device control part 43, a spraying pattern switching command as an instruction for switching the spraying patterns of the left and right liquid spray parts 4L and 4R based on the spraying patterns included in the respective work paths Pw of the target path P, a spraying starting command as an instruction for starting spraying a chemical or the like with the left and right liquid spray parts 4L and 4R based on the working start position included in the target path P, a spraying stopping command as an instruction for stopping spraying a chemical or the like with the left and right liquid spray parts 4L and 4R based on the working stop position included in the target path P, etc. The work device control part 43 executes the spraying control for controlling the state of spraying a chemical or the like with the left and right liquid spray parts 4L and 4R by controlling the operation of the valve unit 4G in response to the spraying pattern switching command, the spraying starting command, the spraying stopping command, or the like which is transmitted from the automated driving control part 40.

Although illustration in a drawing is omitted, the vehicle body 1 is equipped with various kinds of detection devices such as the first rotation sensor for detecting the output rotational speed of the engine 12, the left and right second rotation sensors for detecting the output rotational speed of the hydraulic motor 30B in each HST 30, and the remaining amount sensor for detecting the remaining amount of fuel in the fuel tank 26.

Figure 14:
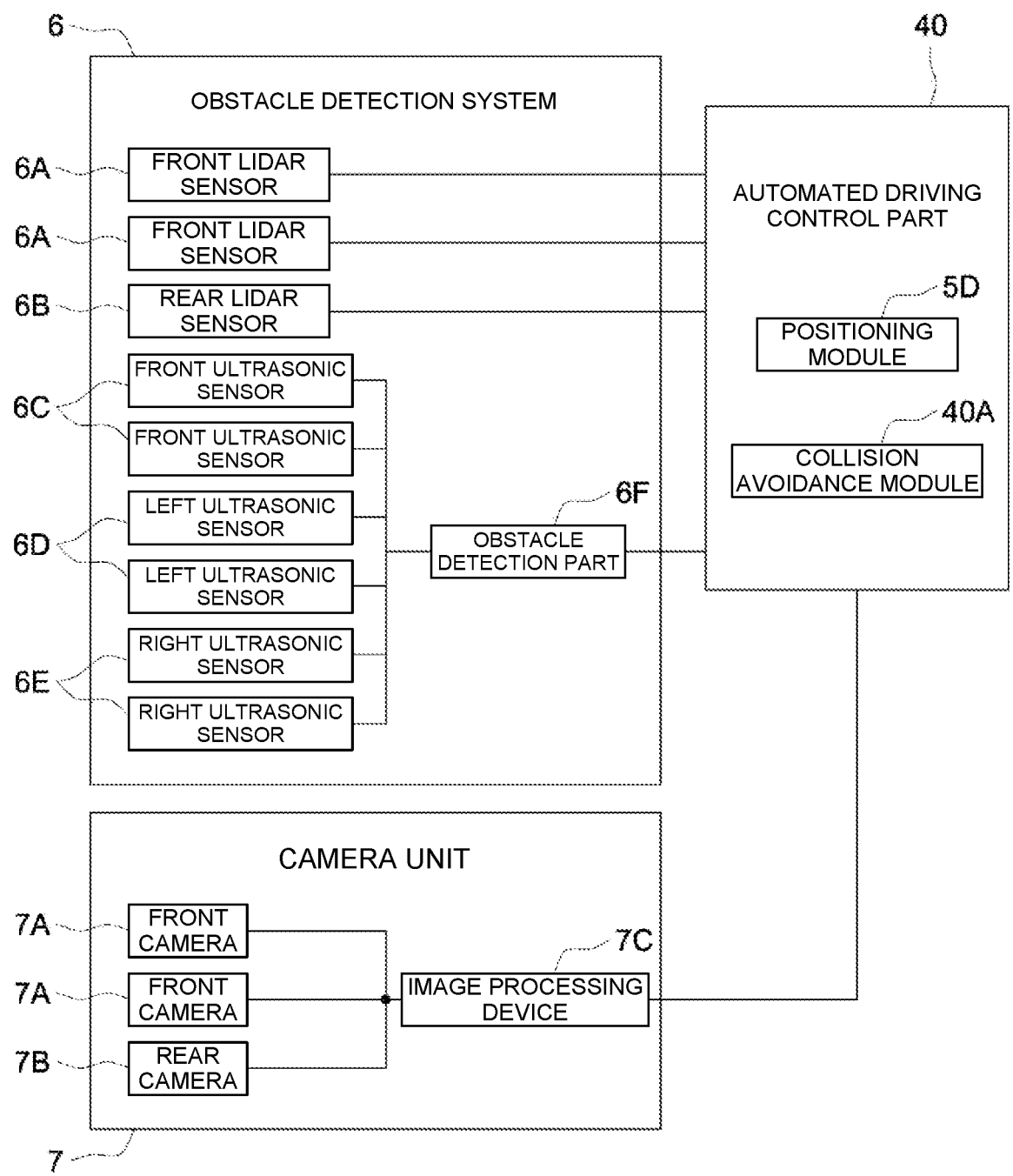
FIG. 14 is a block diagram illustrating a schematic configuration of an obstacle detection system, etc.

As illustrated in FIG. 14, the obstacle detection system 6 includes the left and right front LiDAR sensors 6A and the single rear LiDAR sensor 6B. As illustrated in FIG. 3 to FIG. 4 and FIG. 6, of the left and right front LiDAR sensors 6A, the front LiDAR sensor 6A on the left side is arranged at the left-side front end part on the ceiling part of the vehicle body 1 and in a front-lowering posture so as to look down the front left side of the vehicle body 1 from the diagonally upper side. Accordingly, for the front LiDAR sensor 6A on the left side, a predetermined range on the front left side of the vehicle body is set as its measurement range. As illustrated in FIG. 3 to FIG. 4 and FIG. 7, the front LiDAR sensor 6A on the right side is arranged at the right-side front end part on the ceiling part of the vehicle body 1 and in a front-lowering posture so as to look down the front right side of the vehicle body 1 from the diagonally upper side. Accordingly, for the front LiDAR sensor 6A on the right side, a predetermined range on the front right side of the vehicle body is set as its measurement range. As illustrated in FIG. 5 to FIG. 7, the rear LiDAR sensor 6B is arranged at the rear end part at the center with respect to the left-right direction on the ceiling part of the vehicle body 1 and in a rear-lowering posture so as to look down the rear side of the vehicle body 1 from the diagonally upper side. Accordingly, for the rear LiDAR sensor 6B, a predetermined range on the rear side of the vehicle body is set as its measurement range.

Each of the LiDAR sensors 6A and 6B measures the distance from the respective LiDAR sensor 6A or 6B to each measurement point (measurement target object) in the measurement range by the TOF (Time Of Flight) method, in which the distance to the measurement point is measured based on the round-trip time for an emitted laser beam to return after reaching the measurement point. Each of the LiDAR sensors 6A and 6B performs scanning with a laser beam horizontally and vertically at high speed across the entire measurement range, respectively, so as to sequentially measure the distance to the measurement point at each scan angle (coordinates). Each of the LiDAR sensors 6A and 6B generates a distance image and extracts a group of measurement points that is estimated as an obstacle, based on measurement information such as the measured distance to each measurement point and the scan angle (coordinates) for each measurement point, in order to transmit the measurement information related to the extracted group of measurement points to the automated driving control part 40 as measurement information related to an obstacle.

As illustrate in FIG. 14, the obstacle detection system 6 includes the left and right front ultrasonic sensors 6C, the front and rear left ultrasonic sensors 6D, the front and rear right ultrasonic sensors 6E, and the single obstacle detection part 6F. As illustrated in FIG. 3 to FIG. 4 and FIG. 6 to FIG. 7, the left and right front ultrasonic sensors 6C are arranged at the left and right front end parts of the vehicle body 1 in a forward-facing posture. Accordingly, for the left and right front ultrasonic sensors 6C, predetermined left and right ranges on the front side of the vehicle body are set as their measurement ranges. As illustrated in FIG. 3, the front and rear left ultrasonic sensors 6D are arranged at the front and rear left end parts of the vehicle body 1 in a leftward-facing posture. Accordingly, for the front and rear left ultrasonic sensors 6D, predetermined front and rear ranges on the left outer side of the vehicle body 1 are set as their measurement ranges. The front and rear right ultrasonic sensors 6E are arranged at the front and rear right end parts of the vehicle body 1 in a rightward-facing posture. Accordingly, for the front and rear right ultrasonic sensors 6E, predetermined front and rear ranges on the right outer side of the vehicle body 1 are set as their measurement ranges.

The obstacle detection part 6F judges whether or not a measurement target object is present in the measurement ranges of the respective ultrasonic sensors 6C to 6E, based on transmission and reception of ultrasonic waves by the respective ultrasonic sensors 6C to 6E. The obstacle detection part 6F measures the distances from the respective ultrasonic sensors 6C to 6E to the measurement target object by the TOF (Time Of Flight) method, in which the distance to the measurement point is measured based on the round-trip time for an emitted ultrasonic wave to return after reaching the measurement point. The obstacle detection part 6F transmits the measured distance to the measurement target object and the direction of the measurement target object to the automated driving control part 40 as measurement information related to an obstacle.

Each of the LiDAR sensors 6A and 6B and the obstacle detection part 6F includes an electronic control unit in which a microcontroller or the like is mounted, various kinds of control programs stored in a non-volatile memory (e.g., an EEPROM such as a flash memory) of the microcontroller, etc. Each of the LiDAR sensors 6A and 6B and the obstacle detection part 6F is connected to the automated driving control part 40 via CAN so as to be capable of performing mutual communication.

As illustrated in FIG. 2 and FIG. 14, the automated driving control part 40 includes the collision avoidance module 40A that avoids the risk that the work vehicle V collides with an obstacle, based on measurement information related to an obstacle, which is obtained from the respective LiDAR sensors 6A and 6B and the obstacle detection part 6F. The collision avoidance module 40A is structured with a control program for collision avoidance, etc., which is stored in a non-volatile memory of the automated driving control part 40.

As illustrated in FIG. 14, the camera unit 7 is equipped with the left and right front cameras 7A which capture images of the front side of the vehicle body 1, the single rear camera 7B which captures an image of the rear side of the vehicle body 1, and the image processing device 7C which processes the images obtained from each of the cameras 7A and 7B. As illustrated in FIG. 3 to FIG. 4, FIG. 6, and FIG. 8, of the left and right front cameras 7A, the front camera 7A on the left side is arranged at the left-side front end part on the ceiling part of the vehicle body 1 and in a front-lowering posture so as to look down the front left side of the vehicle body 1 from the diagonally upper side. Accordingly, for the front camera 7A on the left side, a predetermined range on the front left side of the vehicle body is set as its image-capturing range. As illustrated in FIG. 3 to FIG. 4 and FIG. 7 to FIG. 8, the front camera 7A on the right side is arranged at the right-side front end part on the ceiling part of the vehicle body 1 and in a front-lowering posture so as to look down the front right side of the vehicle body 1 from the diagonally upper side. Accordingly, for the front camera 7A on the right side, a predetermined range on the front right side of the vehicle body is set as its image-capturing range. As illustrated in FIG. 5 to FIG. 8, the rear camera 7B is arranged at the rear end part at the center with respect to the left-right direction on the ceiling part of the vehicle body 1 and in a rear-lowering posture so as to look down the rear side of the vehicle body 1 from the diagonally upper side. Accordingly, for the rear camera 7B, a predetermined range on the rear side of the vehicle body is set as its image-capturing range.

The image processing device 7C includes an electronic control unit in which a microcontroller or the like is mounted, various kinds of control programs stored in a non-volatile memory (e.g., an EEPROM such as a flash memory) of the microcontroller, etc. On the image processing device 7C, a learning process for recognizing fruit trees, etc., in an orchard is performed. The image processing device 7C is connected to the automated driving control part 40 via CAN so as to be capable of performing mutual communication. The image processing device 7C processes information obtained from each of the cameras 7A and 7B, so as to generate a left front image of the vehicle body, a right front image of the vehicle body, and a rear image of the vehicle body, etc., and transmit them to the automated driving control part 40. The automated driving control part 40 transfers each of the transmitted images to the terminal control part 3B of the mobile communication terminal 3. Accordingly, it is possible to display the left front image of the vehicle body, the right front image of the vehicle body, the rear image of the vehicle body, etc., on the display device 3A of the mobile communication terminal 3. Then, the user can easily grasp the situation on the front side of the vehicle body and the situation on the rear side of the vehicle body by looking at each image displayed on the display device 3A.

Note that it is also possible that the camera unit 7 is included in the obstacle detection system 6. In this case, the detection of obstacles can be performed with high accuracy, based on information related to an obstacle which is obtained from the respective ultrasonic sensors 6C to 6E and the respective LiDAR sensors 6A and 6B with high positioning accuracy as well as information related to an obstacle which is obtained from the camera unit 7 with high accuracy of object determination.

That is, the above-described automated driving unit 2 includes the positioning unit 5, the obstacle detection system 6, the camera unit 7, the automated driving control part 40, the engine control part 41, the HST control part 42, the work device control part 43, etc. Further, with proper operation of these, it is possible to make the work vehicle V perform automated driving with accuracy according to the target path P, and it is also possible for the spray device 4 to properly perform the work of spraying a chemical or the like.

Figure 15:
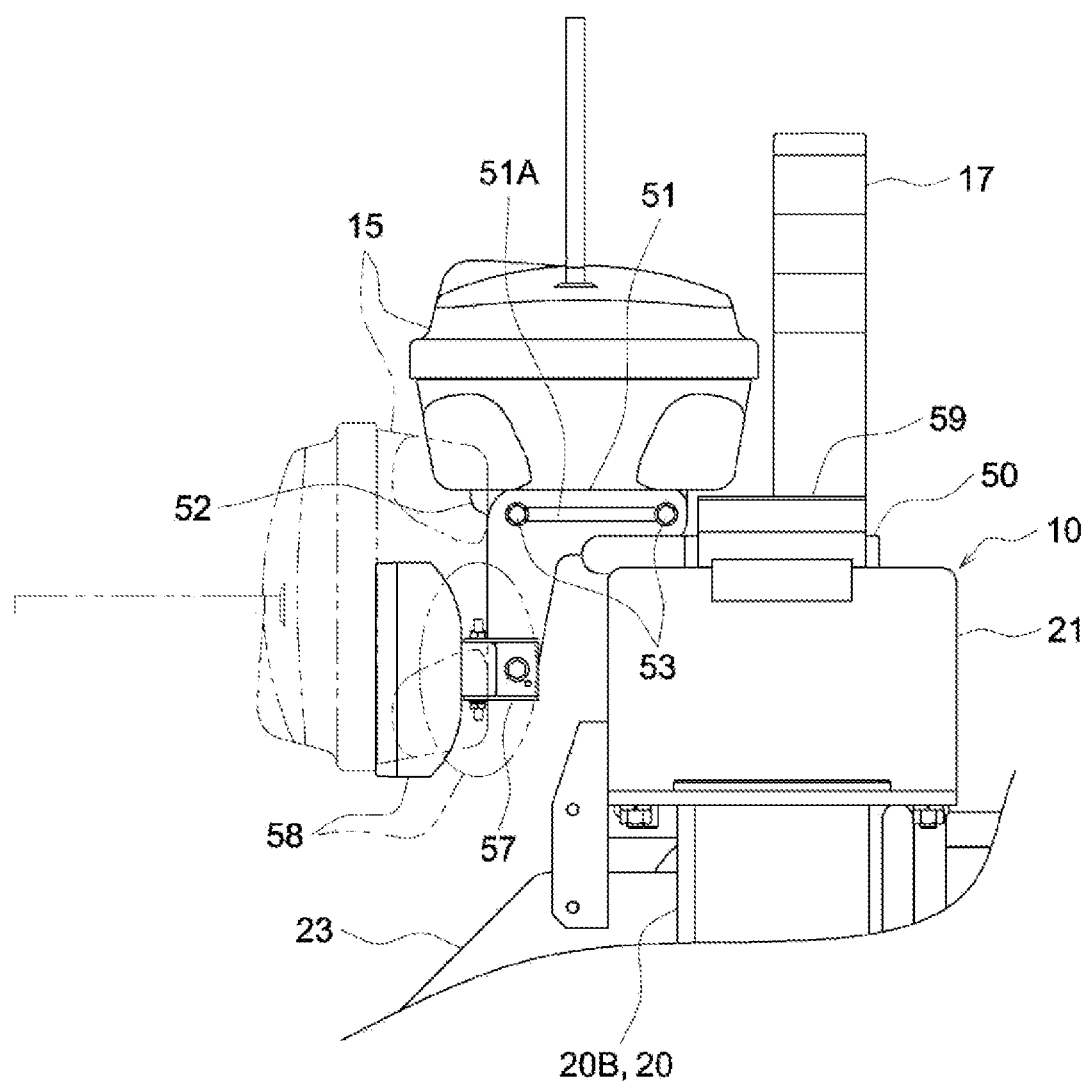
FIG. 15 is a side view of a main part illustrating a using position and a retracted position of an antenna unit.

As illustrated in FIG. 3 to FIG. 4, FIG. 8, and FIG. 15, the support member 50, which has a U-shape in plan view and supports the front antenna unit 15, is attached to the front cross member 21 of the vehicle body frame 10. As illustrated in FIG. 4 and FIG. 15, the support member 50 includes left and right support plates 51 formed in a downward-facing L-shape in a side view. As illustrated in FIG. 15, in the upper end part of each of the support plates 51, the long hole 51A is formed so as to extend in the front-rear direction of the vehicle body. To the respective support plates 51, the left and right brackets 52 arranged at the bottom part of the front antenna unit 15 are connected via the front-rear pair of bolts 53, etc., by utilizing those long holes 51A. With this configuration, by loosening the connection with each of the support plates 51 via the rear bolt 53, etc., after releasing the connection with each of the support plates 51 via the front bolt 53, etc., it is possible to reposition the front antenna unit 15 from the using position above the vehicle body, which is indicated with the solid lines in FIG. 15, to the retracted position in the front of the vehicle body, which is indicated with the dashed-two-dotted lines in FIG. 15.

As illustrated in FIG. 3 and FIG. 5 to FIG. 8, the support member 54, which has a U-shape in plan view and supports the rear antenna unit 16, is attached to the rear cross member 22 of the vehicle body frame 10. As illustrated in FIG. 5 to FIG. 7, the support member 54 includes left and right support plates 55 formed in a downward-facing L-shape in a side view. In the upper end part of each of the support plates 55, the long hole 55A is formed so as to extend in the front-rear direction of the vehicle body. To the respective support plates 55, left and right brackets (not illustrated in the drawings) arranged at the bottom part of the rear antenna unit 16 are connected via the front-rear pair of bolts 56, etc., by utilizing those long holes 55A. With this configuration, by loosening the connection with each of the support plates 55 via the rear bolt 56 etc., after releasing the connection with each of the support plates 55 via the rear bolt 56, etc., it is possible to reposition the rear antenna unit 16 from the using position above the vehicle body to the retracted position in the rear of the vehicle body.

As illustrated in FIG. 3 to FIG. 4, FIG. 8, and FIG. 15, the left and right front lights 58 are attached to the front lower part of the left and right support plates 51 via the left and right support brackets 57. The left and right support brackets 57 are connected to the left and right support plates 51 via bolts in a state of being able to adjust the angles thereof in the up-down direction. The left and right front lights 58 are connected to the left and right support brackets 57 via bolts in a state of being able to swing and change the position thereof in the left-right direction. With this configuration, it is possible for the left and right front lights 58 to adjust their lighting direction in the up-down direction and the left-right direction. Further, as illustrated in FIG. 15, in a case of repositioning the front antenna unit 15 from the using position, which is indicated with the solid lines in FIG. 15, to the retracted position, which is indicated with the dashed-two-dotted lines in FIG. 15, the front antenna unit 15 can be avoided from interfering with the left and right front lights 58 by repositioning the left and right front lights 58 from the forward-facing using position to the laterally-outward-facing retracted position.

As illustrated in FIG. 3 to FIG. 6, FIG. 8, and FIG. 15, the bracket 59 to which the above-described indicator light 17 is detachably attached is connected to the left side of the support member 50.

With the above-described configuration, in this work vehicle V, by changing the position of each of the antenna units 15 and 16 from the using position to the retracted position and removing the indicator light 17 from the bracket 59, it is possible to suppress occurrence of such an inconvenience that each of the antenna units 15 and 16 and the indicator light 17 make contact with other objects and get damaged in a case where the work vehicle V is retracted in a storage or the like or transported by a transport vehicle or the like.

As illustrated in FIG. 3 and FIG. 5 to FIG. 8, the left and right combination lamps 60 having stop lamps and back lamps are attached to the left and right support plates 55. The left and right combination lamps 60 are arranged in such positions so as not to interfere with the repositioning of the above-described rear antenna unit 16.

As illustrated in FIG. 3 to FIG. 4, FIG. 6, and FIG. 8, on the left side of the vehicle body 1, the power source switch 61 for controlling on/off of the power supply from the battery 13 to each electrical component such as each of the control parts 40 to 43 is attached to the bracket 59 that supports the indicator light 17. The step 62 for enabling the user to ride while standing is attached to the support plate 27 on the left side. The left cover member 18 is equipped with the upper cover 18A (see FIG. 3), which is positioned at the middle part of the left cover member 18 with respect to the front-rear direction so as to be swingable for opening and closing in the up-down direction. Further, the left side interior of the vehicle body 1 is equipped with the cross-swing-type operation lever 63 (see FIG. 6) which can be manually operated in a case where the upper cover 18A is held in the open position. The operation lever 63 is connected to the automated driving control part 40 via a sensor unit (not illustrated in the drawings), etc., which detects the operation direction and operation amount thereof. The automated driving control part 40 transmits the switching of the driving states of the vehicle body 1 to the HST control part 42 in accordance with the operation direction and operation amount of the operation lever 63, which are transmitted from the sensor unit. The HST control part 42 controls operation of each HST 30 in accordance with the switching of the driving states, which is transmitted from the automated driving control part 40.

That is, the user can stand on the step 62 of this work vehicle V so as to easily operate the power source switch 61. Further, the user can stand on the step 62 in a state where the upper cover 18A is held in the open position, so as to be capable of manual moving/driving by utilizing the operation lever 63.

As illustrated in FIG. 16 to FIG. 20, the automated driving control by the automated driving control part 40 includes the trajectory-following control in which the control target position pv of the work vehicle V is set at the position on the target path P that is distant from the current position p0 of the work vehicle V (vehicle body 1) by the predetermined distance (e.g., 1 m) L1 in the travel direction, so that the work vehicle V is made to perform automated driving so as to follow this control target position pv. Accordingly, it is possible for the automated driving control part 40 to make the work vehicle V perform automated driving according to the target path P.

Figure 16:
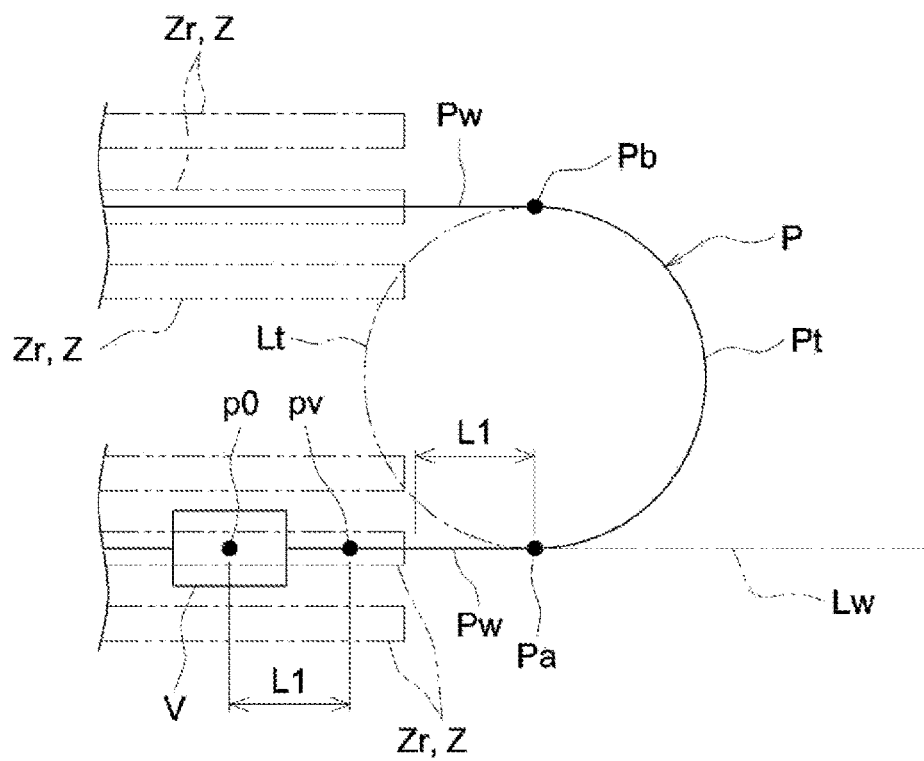
FIG. 16 is an explanatory diagram illustrating a setting state of a control target position when the work vehicle on a work path is not located in the vicinity of the boundary to a turning path.

As a detailed description of the trajectory-following control, as illustrated in FIG. 16, the automated driving control part 40 sets the control target position pv on the work path Pw during the time until the work vehicle V is located on the work path Pw in the vicinity of the boundary to the next turning path Pt, in other words, during the time in which the current position p0 of the work vehicle V is located on the work path Pw that is distant from the first connection point Pa (boundary) between the end point of the work path Pw and the start point of the turning path Pt by the predetermined distance L1 or more, so that the work vehicle V is made to perform automated driving so as to follow this control target position pv. Accordingly, it is possible for the automated driving control part 40 to make the work vehicle V perform automated driving according to the work path Pw during the time until the work vehicle V on the work path Pw moves to the vicinity of the boundary to the next turning path Pt. As a result, it is possible to avoid the risk that the work vehicle V deviates from the work path Pw and collide with fruit trees Z located in the space of the work vehicle V or on the left and right sides thereof.

Figure 17:
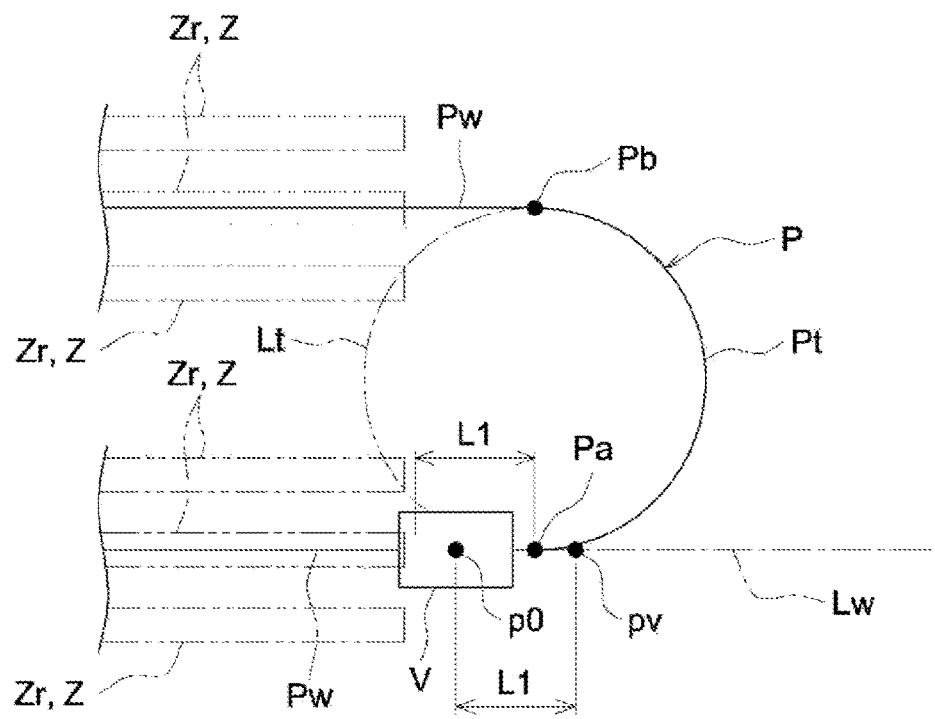
FIG. 17 is an explanatory diagram illustrating a setting state of the control target position when the work vehicle on a work path is located in the vicinity of the boundary to a turning path.

As illustrated in FIG. 17, the automated driving control part 40 sets the control target position pv on the extension Lw of the work path Pw when the work vehicle V is located on the work path Pw in the vicinity of the boundary to the next turning path Pt, in other words, during the time in which the current position p0 of the work vehicle V is located on the work path Pw within the predetermined distance L1 from the above-described first connection point Pa, so that the work vehicle V is made to perform automated driving so as to follow this control target position pv. Accordingly, it is possible to make the work vehicle V perform automated driving according to the work path Pw while maintaining its posture along the work path Pw until the work vehicle V is about to shift from the work path Pw to the next turning path Pt. As a result, it is possible to avoid the risk that the work vehicle V starts making a turn and collides with fruit trees Z before completely exiting from the fruit tree row Zr or from between fruit tree rows Zr in the vicinity of the boundary between the work path Pw and the turning path Pt.

Figure 18:
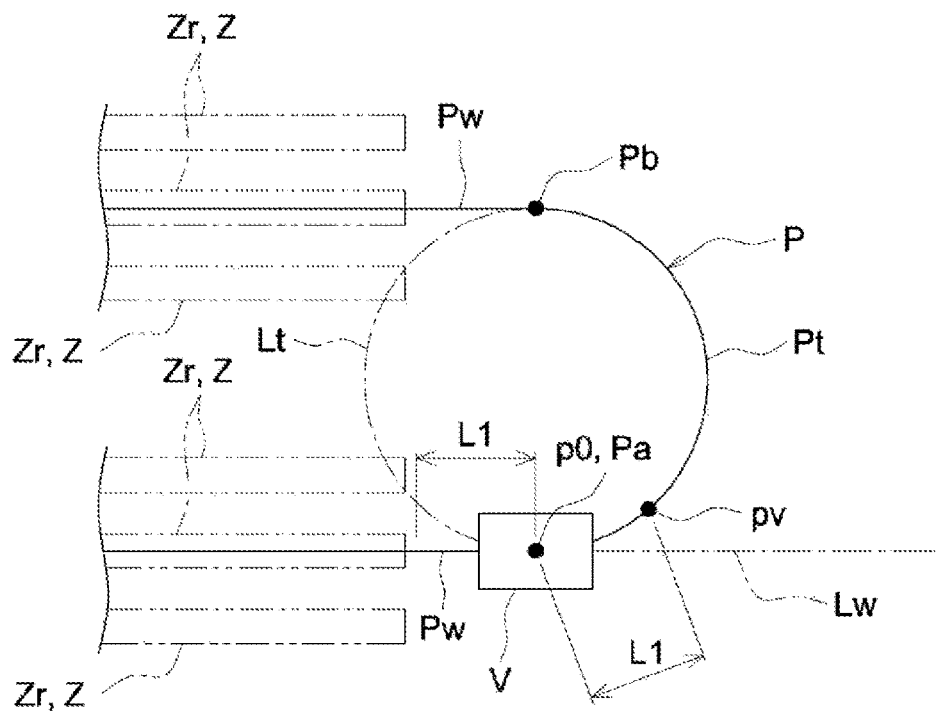
FIG. 18 is an explanatory diagram illustrating a setting state of the control target position when the work vehicle is located t the boundary of a work path and a turning path.
Figure 19:
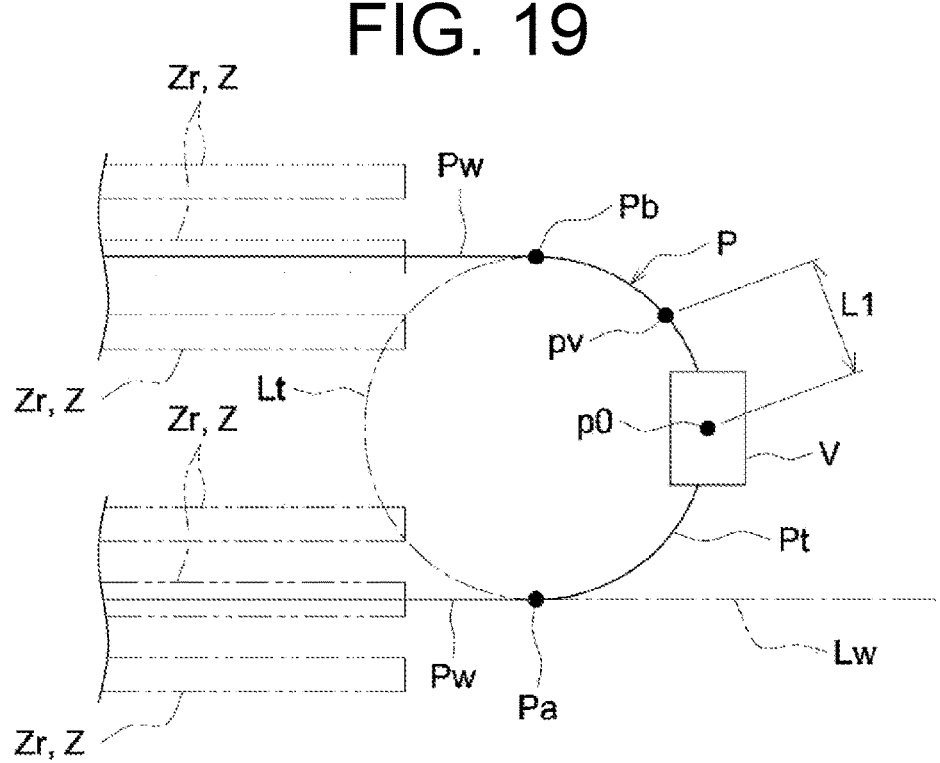
FIG. 19 is an explanatory diagram illustrating a setting state of the control target position when the work vehicle on a turning path is not located in the vicinity of the boundary to a work path.

As illustrated in FIG. 18, when the work vehicle V reaches the boundary between the work path Pw and the next turning path Pt, in other words, when the current position p0 of the work vehicle V is located on the above-described first connection point Pa, the automated driving control part 40 switches the control target position pv from the extension Lw of the work path Pw onto the turning path Pt. Further, as illustrated in FIG. 19, the automated driving control part 40 sets the control target position pv on the turning path Pt during the time until the work vehicle V is located on the turning path Pt in the vicinity of the boundary to the work path Pw, in other words, during the time in which the current position p0 of the work vehicle V is located on the turning path Pt that is distant from the second connection point Pb (boundary) between the end point of the turning path Pt and the start point of the work path Pw by the predetermined distance L1 or more, so that the work vehicle V is made to perform automated driving so as to follow this control target position pv. Accordingly, it is possible to make the work vehicle V perform automated driving according to the turning path Pt during the time until the work vehicle V is located on the turning path Pt in the vicinity of the boundary to the next work path Pw.

Figure 20:
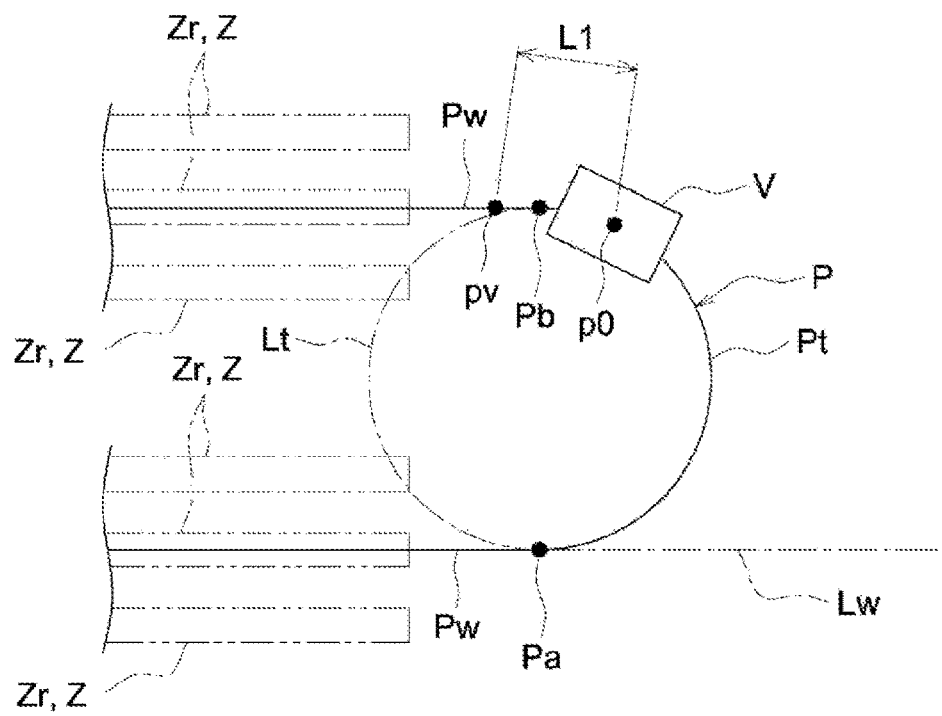
FIG. 20 is an explanatory diagram illustrating a setting state of the control target position when the work vehicle on a turning path is located in the vicinity of the boundary to a work path.

As illustrated in FIG. 20, the automated driving control part 40 sets the control target position pv on the work path Pw when the work vehicle V is located on the turning path Pt in the vicinity of the boundary to the next work path Pw, in other words, when the current position p0 of the work vehicle V is located on the turning path Pt within the predetermined distance L1 from the above-described second connection point Pb, so that the work vehicle V is made to perform automated driving so as to follow this control target position pv. Accordingly, when the work vehicle V is located on the turning path Pt in the vicinity of the boundary to the next work path Pw, while making the work vehicle V perform automated driving according to the turning path Pt, it is possible to make the posture of the work vehicle V more suitable for driving on the work path Pw as the work vehicle V approaches the work path Pw. As a result, when the work vehicle V completes the turn-driving on the turning path Pt, the position and posture of the work vehicle V can be made suitable for the work vehicle V to move onto the next fruit tree row Zr or into the space between fruit tree rows Zr.

The automated driving control part 40 also sets the control target position pv on the work path Pw during the time until the work vehicle V passes through the boundary between the turning path Pt and the next work path Pw and is located on the next work path Pw in the vicinity of the boundary to the next turning path Pt, in other words, during the time in which the current position p0 of the work vehicle V passes through the above-described second connection point Pb and is located on the path that is distant from the above-described first connection point Pa of the next work path Pw by the predetermined distance L1 or more, so that the work vehicle V is made to perform automated driving so as to follow this control target position pv (see FIG. 16).

In this way, if the automated driving control part 40 sets the control target position pv and makes the work vehicle V perform automated driving so as to follow this control target position pv, it is possible to avoid the risk that the work vehicle V takes an inappropriate posture or path and collides with the fruit trees Z when the work vehicle V exits from the fruit tree row Zr or from between fruit tree rows Zr and when the work vehicle V moves onto the next fruit tree row Zr or into the space between fruit tree rows Zr, not only in a case where the work vehicle V performs driving on the fruit tree row Zr or between fruit tree rows Zr.

Further, since the work path Pw need not be long relative to the fruit tree rows Zr in order to enable such collision avoidance, it is possible to shorten the non-work paths such as the turning paths Pt included in the target path P as much as possible, so as to shorten the work time, reduce the fuel consumption amount, etc.

In addition, since the automated driving control part 40 does not set the control target position pv on the extension Lt of the turning path Pt during the time in which the work vehicle V is located on the turning path Pt, it is possible to avoid the risk that the work vehicle V deviates from the turning path Pt due to the control target position pv being set on the extension Lt of the turning path Pt.

Figure 21:
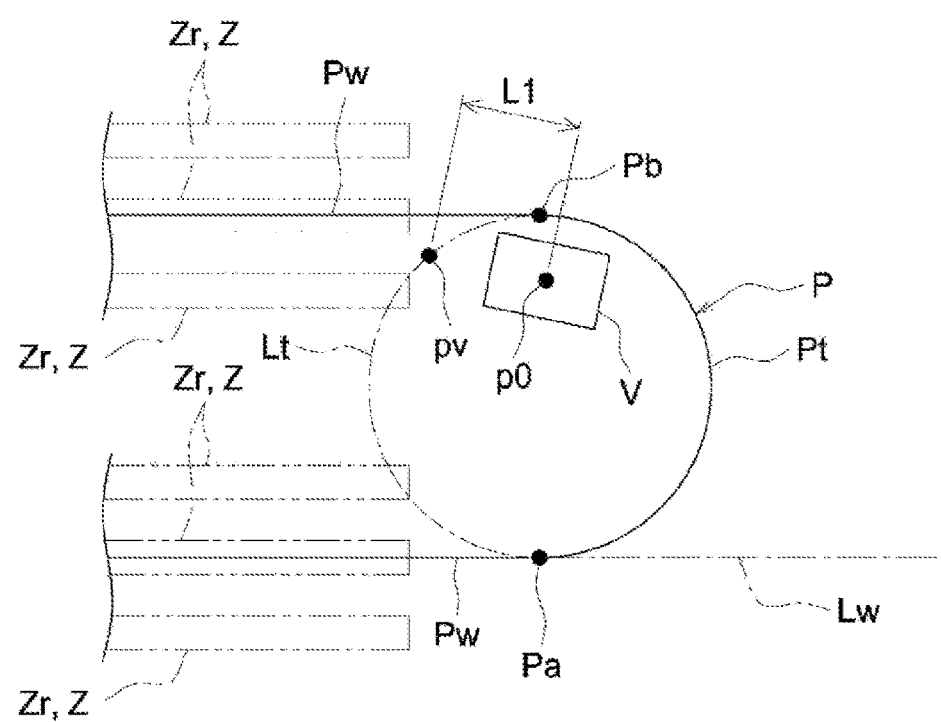
FIG. 21 is an explanatory diagram illustrating a comparative example of a setting state of the control target position when the work vehicle being deviated from a turning path is located in the vicinity of the boundary to a work path.
Figure 22:
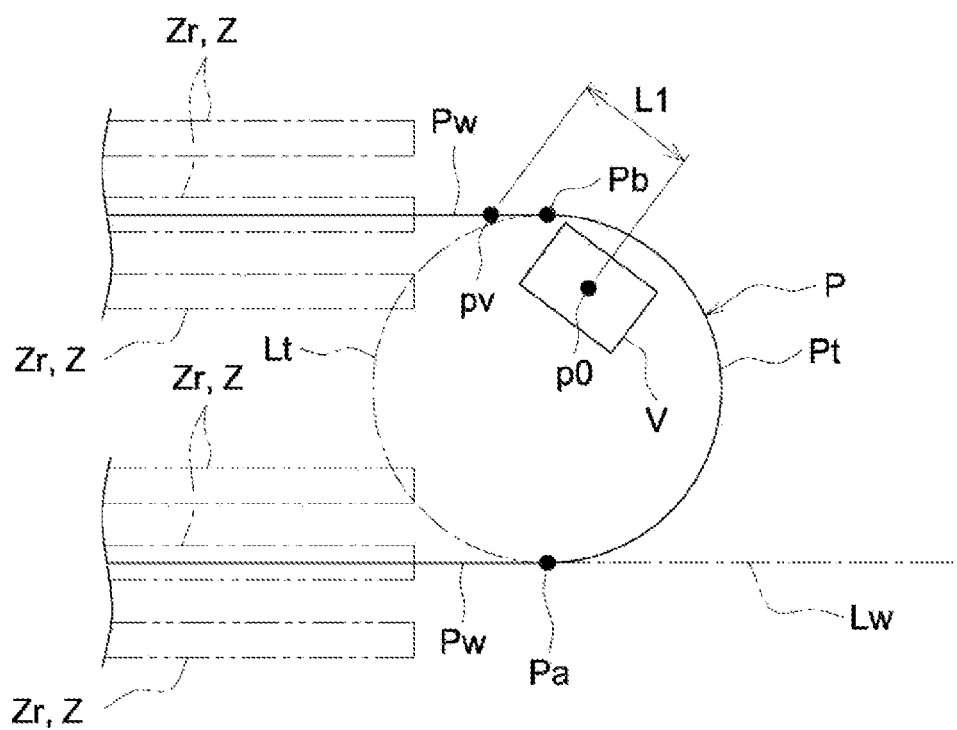
FIG. 22 is an explanatory diagram illustrating a setting state of the control target position when the work vehicle being deviated from a turning path is located in the vicinity of the boundary to a work path.

Further, as illustrated in FIG. 21 to FIG. 22, during turn-driving on the turning path Pt, even if positional deviation from the turning path Pt occurs to the work vehicle V, the automated driving control part 40 does not set the control target position pv on the extension Lt of the turning path Pt as illustrated in FIG. 21 but sets the control target position pv on the work path Pw as illustrated in FIG. 22, and thus, even if positional deviation from the turning path Pt occurs to the work vehicle V, the position and posture of the work vehicle V can be made proper for moving onto the next fruit tree row Zr or into the space between fruit tree rows Zr when the work vehicle V moves onto the next fruit tree row Zr or into the space between fruit tree rows Zr.

Grapes for wine, etc., are grown on an inclined site so that the fruit tree rows along contour lines are aligned with predetermined intervals in the inclination direction for the sake of good sunlight. In the target path P generated for such an orchard, the respective work paths Pw are generated along contour lines, and the respective turning paths Pt are generated across upper and lower work paths Pw. Therefore, in a case where the work vehicle V is made to perform automated driving according to the target path P as described above, the work vehicle V performs turn-driving in the inclination direction according to the turning paths Pt.

On the other hand, since the work vehicle V exemplified in the present embodiment is for spraying work, if the remaining amount of spray liquid in the storage tank 4A is decreased along with the driving for work, this decrease in the remaining amount will affect the turning performance at the time where the work vehicle V performs turn-driving in the inclination direction according to the turning paths Pt in the work site.

Figure 23:
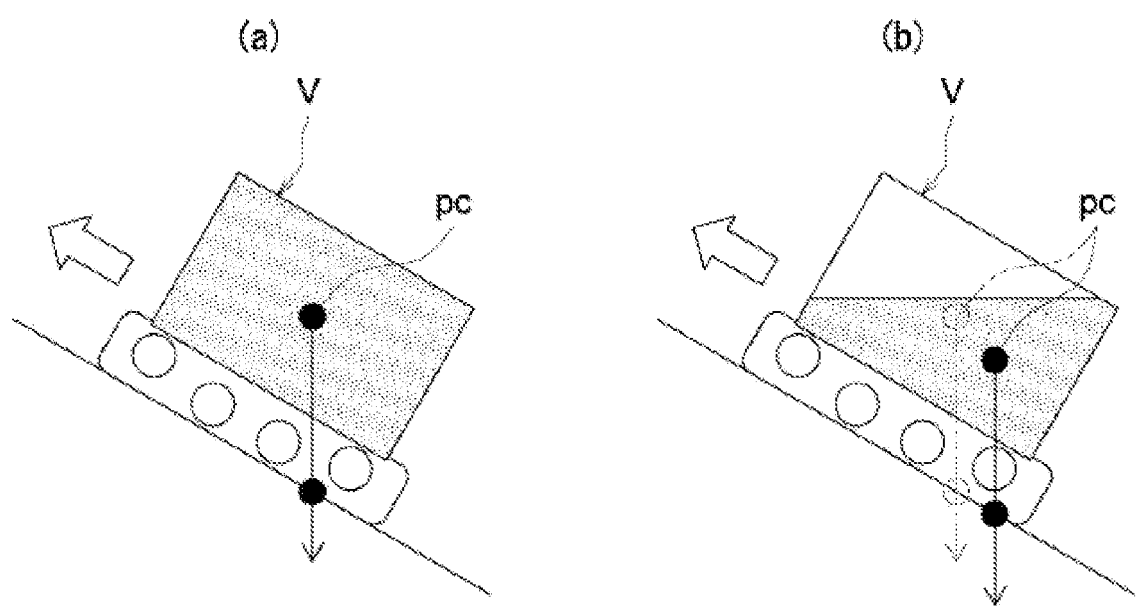
FIG. 23 is an explanatory diagram illustrating a change of the gravity-center position along with an increase and decrease of spray liquid in the work vehicle during turn-driving on an inclined surface.
Figure 24:
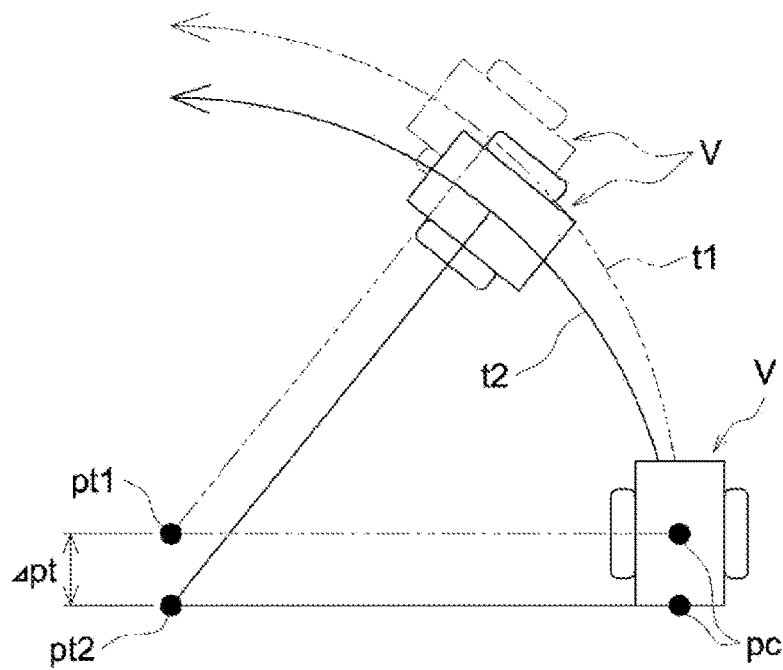
FIG. 24 is an explanatory diagram illustrating changes of the turning-center position and turn-driving trajectory along with a change of the gravity-center position in the work vehicle during turn-driving on an inclined surface.
Figure 25:
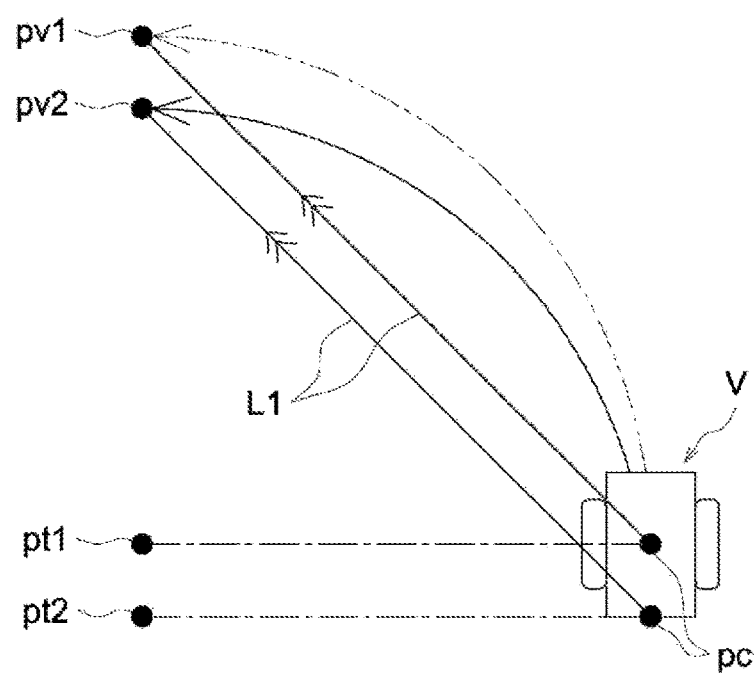
FIG. 25 is an explanatory diagram illustrating a setting state of control target positions in the trajectory-following control with different turning-center positions.

Specifically, for example, as illustrated in FIG. 23 to FIG. 25, when the work vehicle V makes a turn toward the upper side of the inclination direction, the gravity-center position pc of the vehicle body 1 is changed to the rear side of the vehicle body 1 in the state where there is less spray liquid inside the storage tank 4A (see FIG. 23(b)), as compared with the state where there is more spray liquid inside the storage tank 4A (see FIG. 23(a)), and thus the position of the ground in which this gravity-center position pc is reflected is changed as well. Accordingly, as illustrated in FIG. 24, there will be a difference between the turning-center position pt1 of the left and right crawlers 11 in a state where the amount of spray liquid inside the storage tank 4A is high and the turning-center position pt2 of the left and right crawlers 11 in a state where the amount of spray liquid inside the storage tank 4A is low, so that, in a case where the left and right crawlers 11 are driven at a constant speed difference, the turn-driving trajectory t2 of the work vehicle V in the state where the amount of spray liquid is low is displaced toward the turning-center side, as compared with the turn-driving trajectory t1 of the work vehicle V in the state where the amount of spray liquid is higher. Therefore, the lower the amount of spray liquid inside the storage tank 4A becomes, the more easily positional deviation of the work vehicle A occurs in the inclination direction from the work path Pw after turning.

Figure 26:
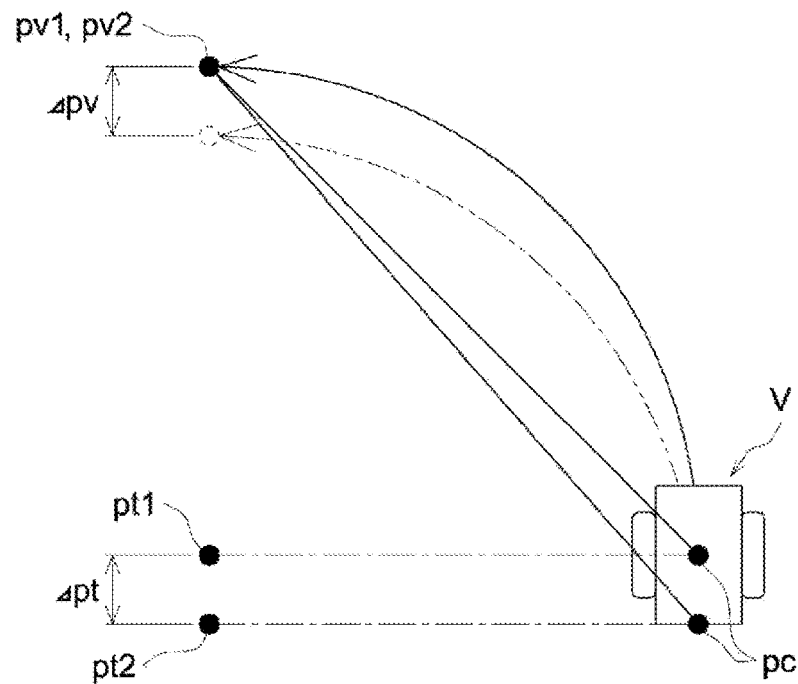
FIG. 26 is an explanatory diagram illustrating a setting state of control target positions that are matched with each other in the trajectory-following control with different turning-center positions.

Therefore, in order to prevent the occurrence of such an inconvenience as described above, it is considered that, as illustrated in FIG. 26, the control target position pv1 at the time where the work vehicle A performs turn-driving according to the turning path Pt in a state where the amount of spray liquid is low is matched with the control target position pv2 at the time where the work vehicle A performs turn-driving according to the turning path Pt in a state where the amount of spray liquid is high, but, conventionally, as illustrated in FIG. 25, the control target positions pv1 and pv2 which are set by the automated driving control part 40 are defined to be at positions on the target path P that are distant from the work vehicle A in the travel directions by the predetermined distance L1, and thus there is a room for improvement since the solution as described above cannot be implemented.

Therefore, in this automated driving system for a work vehicle, in a case where the work vehicle A is located on the turning path Pt, it is possible for the automated driving control part 40 to correct the control target position pv, based on the inclination information of the work site and the remaining amount of spray liquid. Specifically, in the above-described trajectory-following control, in a case where the work vehicle V is located on the turning path Pt, the automated driving control part 40 performs the control target position correction process to correct the control target position pv which is set on the turning path Pt, based on the positional deviation of the turning-center position of the work vehicle V (the positional deviation of the turning-center positions pt1 and pt2 illustrated in FIG. 24 to FIG. 25) that is caused by the amount of spray liquid inside the storage tank 4A, which differs each time the work vehicle V performs turn-driving on the turning path Pt.

Figure 27:
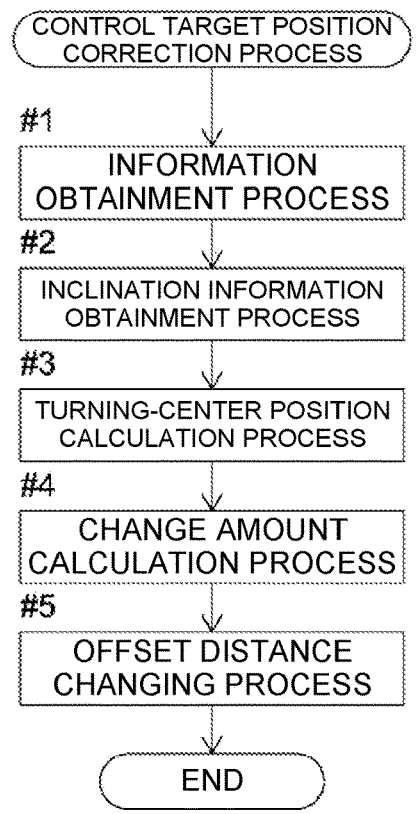
FIG. 27 is a flowchart of a control target position correction process.

Hereinafter, based on the flowchart of FIG. 27, the control operation of the automated driving control part 40 in the control target position correction process will be explained.

The automated driving control part 40 performs the information obtainment process (Step #1), in which, each time the work vehicle V performs turn-driving on the turning path Pt, the detection information from the remaining amount sensor (an example of the remaining amount detection part) 45 (see FIG. 2), which detects the remaining amount of spray liquid in the storage tank 4A, and the measurement information from the inertial measuring device 5E are obtained.

The automated driving control part 40 performs the inclination information obtainment process (Step #2), in which the inclination information of the work site is obtained based on the posture information of the vehicle body 1 which is included in the measurement information from the inertial measuring device 5E. Further, the automated driving control part 40 performs the turning-center position calculation process (Step #3), in which the turning-center positions pt1 and pt2 of the work vehicle V for each turning path Pt is calculated based on the obtained inclination information of the work site and remaining amount of spray liquid.

The automated driving control part 40 performs the change amount calculation process (Step #4), in which the change amount Δpt between the turning-center position pt2 of the work vehicle V which is calculated for the current turning path Pt and the turning-center position pt1 of the work vehicle V which is calculated for the previous turning path Pt is calculated, and performs the offset distance changing process (Step #5), in which this change amount Δpt is set as the correction amount Δpv of the current control target position pv2 corresponding to the previous control target position pv1 so that the offset distance (predetermined distance) L1 from the current position p0 of the work vehicle V on the current turning path Pt to the control target position pv is changed.

Accordingly, in a case where the control target position pv is set on the turning path Pt for making the work vehicle V perform turn-driving toward the inclination direction of the inclined surface, it is possible for the automated driving control part 40 to set (correct) the control target position pv that is set on the current turning path Pt (the control target position pv2 of FIG. 26) to the same position as the control target position pv that is set on the previous turning path Pt (the control target position pv1 of FIG. 26), regardless of the change of the turning-center position of the work vehicle V that is caused by the amount of spray liquid inside the storage tank 4A which differs on each turning path Pt. Then, the work vehicle V performs turn-driving according to the turning path Pt so as to follow the corrected appropriate control target position pv (pv2).

In other words, even if the turning-center position of the work vehicle V is changed due to the amount of spray liquid inside the storage tank 4A that differs on each turning path Pt, the work vehicle V can be made to perform the turning according to the turning path Pt in consideration of the change. As a result, regardless of the amount of spray liquid inside the storage tank 4A that differs on each turning path Pt, it is possible to make the turning performance of the work vehicle A approximately the same on each turning path Pt and to prevent positional deviation of the work vehicle A in the inclination direction from the work path Pw after turning.

Accordingly, it is possible to make the work vehicle V perform automated driving with high precision according to the target path P even in a case where the work vehicle V is made to perform turn-driving in the inclination direction of the inclined site, regardless of reduction in the amount of spray liquid inside the storage tank 4A along with driving for work.

Note that, in this work vehicle V, the inertial measuring device 5E and the automated driving control part 40 function as the inclination information obtainment part that obtains inclination information of a work site on which the target path P is generated. Further, it is also possible that the automated driving control part 40 stores the correction amount Δpv of the control target position pv that is common or unique to each path, which is set in advance for the respective turning paths Pt. Alternatively, it is also possible that the turning path Pt of the target path P is provided with the correction amount Δpv of the control target position pv.

By the way, when the work vehicle V performs turn-driving in the inclination direction, it is possible that the work vehicle V slips toward the lower side of the inclination direction due to the inclination of the work site and the remaining amount of spray liquid, so that the positional deviation from the turning path Pt toward the lower side of the inclination direction occurs to the work vehicle A while making a turn. In such a case, if the automated driving control part 40 calculates the correction amount corresponding to the slip amount based on the inclination information of the work site and the remaining amount of spray liquid so as to thereby enable correction of the control target position pv with this correction amount, the control target position pv corresponding to the turning path Pt can be set outside the turning path Pt with anticipation of the slip amount. Accordingly, it is possible to prevent positional deviation from the turning path Pt toward the lower side of the inclination direction from occurring to the work vehicle A while making a turn.

Figure 28:
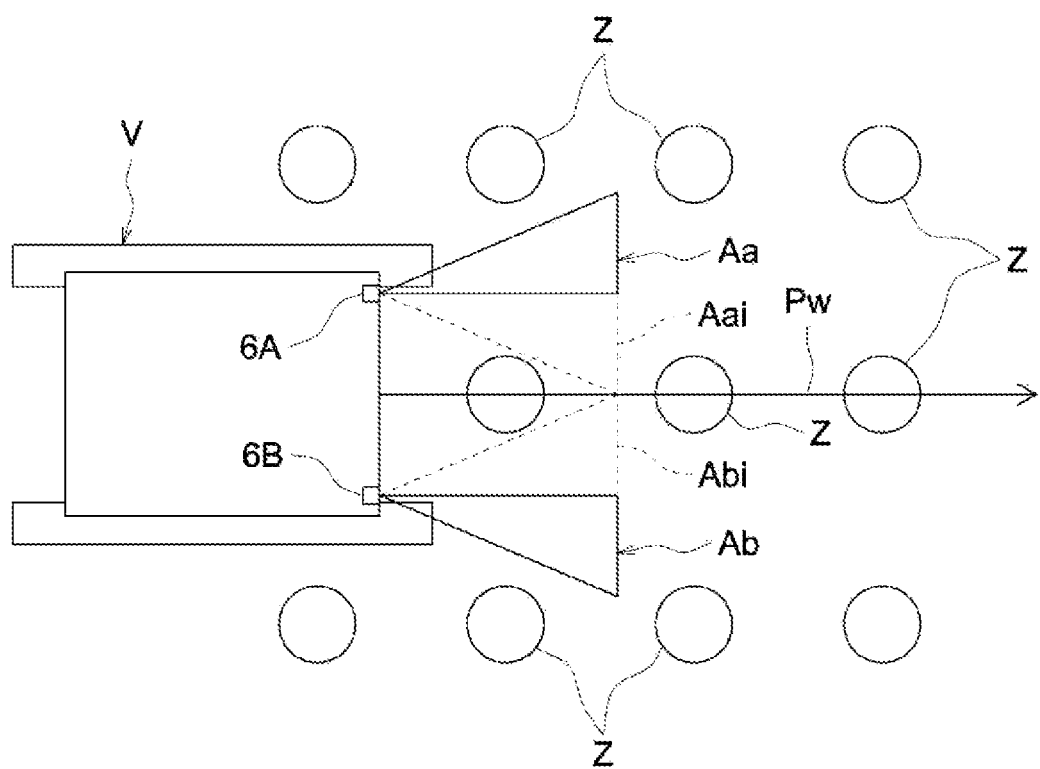
FIG. 28 is an explanatory diagram illustrating measurement ranges of left and right front LiDAR sensors.

As illustrated in FIG. 28, out of the measurement ranges Aa and Ab of the respective LiDAR sensors 6A and 6B, the masking process is performed on the ranges Aai and Abi which are the inner sides of the vehicle body from the left and right centers of the respective measurement ranges Aa and Ab, so that the left and right front LiDAR sensors 6A and 6B do not detect the fruit trees Z that pass through the space of the work vehicle V as obstacles in a case where the work vehicle V is performing automated driving according to the work path Pw. Accordingly, in the case where the work vehicle V is performing automated driving according to the work path Pw, the left and right front LiDAR sensors 6A and 6B detect the fruit trees Z, etc., existing on the left and right sides of the work vehicle V as obstacles.

The collision avoidance module 40A performs the path correction control to correct the path from the current position p0 of the work vehicle V on the target path P up to the predetermined driving-target position pd by use of the potential method, in which a potential function is defined for the driving-target position pd of the work vehicle V that is set by the automated driving control part 40 and the positions of the obstacles such as the fruit trees Z, in order to generate the collision-avoiding path Pe (see FIG. 30) by determining the travel direction according to the gradient of this function.

Figure 29:
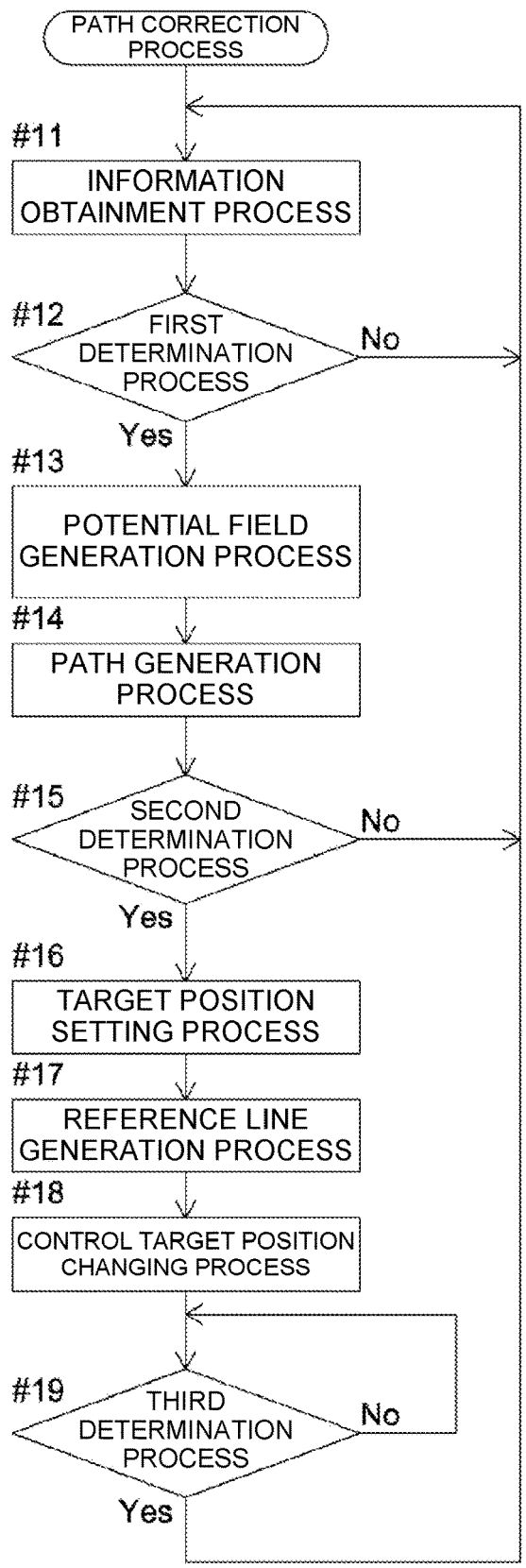
FIG. 29 is a flowchart of a path correction process.
Figure 30:
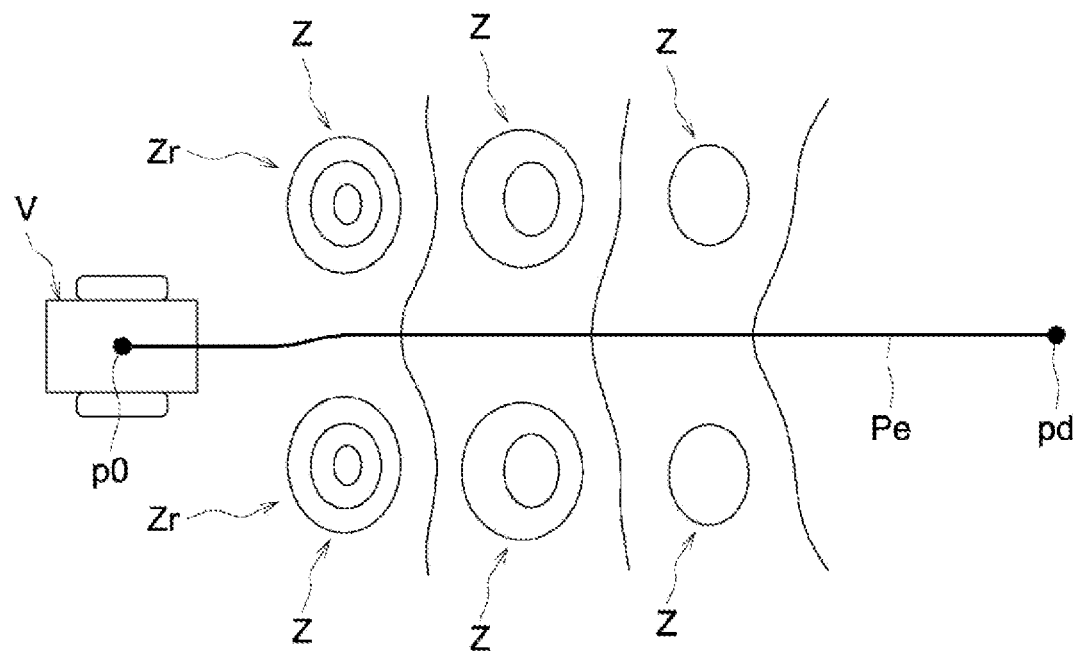
FIG. 30 is an explanatory diagram illustrating an example of a collision-avoiding path which is generated in a potential method.
Figure 31:
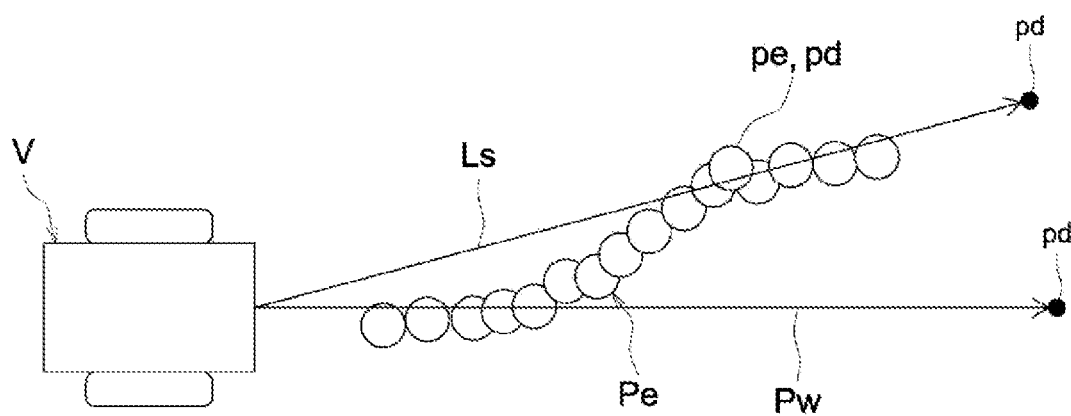
FIG. 31 is an explanatory diagram illustrating an example of path correction based on a collision-avoiding path which is generated in the potential method.

Hereinafter, based on the flowchart of FIG. 29 and the explanatory diagrams of FIG. 30 to FIG. 31, the control operation of the collision avoidance module 40A in the path correction control will be explained.

The collision avoidance module 40A performs the information obtainment process (Step #11), in which the driving-target position pd of the work vehicle V and the measurement information related to obstacles from the left and right front LiDAR sensors 6A and 6B are obtained.

The collision avoidance module 40A performs the first determination process (Step #12), in which whether or not an obstacle is detected by at least either one of the left and right front LiDAR sensors 6A and 6B is determined, and performs the potential field generation process (Step #13) to generate a potential field in which, in a case where an obstacle is detected, an attractive force potential is generated on the driving target position coordinates and a repulsive force potential is generated on the obstacle coordinates.

In a case where no obstacle is detected by the left and right front LiDAR sensors 6A and 6B in the first determination process, the collision avoidance module 40A stands by until an obstacle is detected.

The collision avoidance module 40A performs the path generation process (Step #14), in which the collision-avoiding path Pe from the current position p0 of the work vehicle V up to the driving-target position pd is generated based on the gradient of the generated potential field, and performs the second determination process (Step #15), in which whether or not the curved point pe with an angular change that is greater than a predetermined value exists on the collision-avoiding path Pe is determined.

The collision avoidance module 40A performs the target position setting process (Step #16), in which the curved point pe is set as the driving-target position pd in a case where the curved point pe exists in the second determination process, and performs the reference line generation process (Step #17), in which the driving reference line Ls extending from the current position p0 of the work vehicle V to pass through the curved point pe is generated. Further, the collision avoidance module 40A performs the control target position changing process (Step #18), in which the setting of the control target position pv is changed from the work path Pw onto the driving reference line Ls.

In a case where no curved point pe exist in the second determination process, the processing is returned to Step #11, so that the collision avoidance module 40A maintains the state in which the control target position pv is set on the work path Pw.

After performing the control target position changing process, the collision avoidance module 40A performs the third determination process (Step #19), in which whether or not the current position p0 of the work vehicle V has reached the curved point pe (the driving-target position pd) is determined, and, in the case of having reached the curved point pe, the processing is returned to Step #11, so that the collision-avoiding path Pe from the curved point pe (the current position p0 of the work vehicle V) to the next driving-target position pd will be generated. In the case of having not reached the curved point pe, the stand-by state is remained until the current position p0 of the work vehicle V reaches the curved point pe.

That is, in a case where the work vehicle V is located on the work path Pw, when fruit trees Z of the fruit tree rows Zr adjacent to the work path Pw, etc., are detected as obstacles by the left and right front LiDAR sensors 6A and 6B, the collision avoidance module 40A can change the setting of the control target position pv onto the driving reference line Ls for collision avoidance which is deviated from the work path Pw, based on the detection by the left and right front LiDAR sensors 6A and 6B.

Accordingly, in the trajectory-following control for making the work vehicle V follow the control target position pv, it is possible to make the work vehicle V perform automated driving in the state of approximately following the work path Pw while the work vehicle V avoids the risk of colliding with fruit trees Z of the fruit tree rows Zr adjacent to the work path Pw, etc.

Further, it is possible to easily perform such collision avoidance with high precision in generation of the collision-avoiding path Pe by use of the potential method even in an orchard where a number of obstacles such as fruit trees Z exist around the target path P.

Other Embodiments

Explanations will be given of other embodiments of the present invention.

Note that the configuration of each of the other embodiments explained below can, not only be applied independently, but also be applied in combination with the configuration of another embodiment.

(1) For example, it is also possible that the work vehicle V is configured as an electric model which is equipped with left and right electric motors, instead of the engine 12 and the pair of HSTs 30, for independently driving the left and right crawlers 11.

(2) It is also possible that the work vehicle V is connected to the vehicle body frame 10 so that either one or both of the left and right crawlers 11 can be raised and lowered via a raising/lowering drive unit.

(3) It is also possible that the work vehicle V is configured so that the left-right width of the vehicle body 1 can be changed together with the left-right distance between the left and right crawlers 11.

(4) It is also possible that the work vehicle V is configured as a wheel model equipped with left and right front wheels and left and right rear wheels, a semi-crawler model equipped with left and right crawlers instead of the left and the right rear wheels, etc.

[Addendum of the Invention]

The first characteristic configuration of the present invention is an automated driving system for a work vehicle including a position information obtainment part, which obtains position information of the work vehicle, and an automated driving control part, which makes the work vehicle perform automated driving according to a target path that is generated in advance, wherein the target path includes a plurality of work paths, which are aligned in parallel at a predetermined interval, and a plurality of turning paths, which connect the plurality of work paths in a driving order of the work vehicle, the automated driving control part sets a control target position, so as to thereby enable automated driving of the work vehicle according to the target path, the automated driving control part sets the control target position on an extension of the work path when the work vehicle is located on the work path in a vicinity of a boundary to the turning path, and the automated driving control part sets the control target position on the work path when the work vehicle is located on the turning path in a vicinity of a boundary to the work path.

According to the present configuration, the work vehicle performs driving according to the work path so as to follow the control target position, which is set on the extension of the work path by the automated driving control part, during the time in which the work vehicle is located on the work path in the vicinity of the boundary to the turning path. Accordingly, the work vehicle performs driving according to the work path while maintaining the posture along with the work path until the work vehicle is about to shift from the work path to the turning path.

Further, the work vehicle performs driving according to the turning path so as to follow the control target position that is set on the next work path by the automated driving control part during the time in which the work vehicle is located on the turning path in the vicinity of the boundary to the work path. Accordingly, during the time in which the work vehicle shifts from the turning path to the work path, the work vehicle performs driving according to the turning path while making its posture be such a posture along the work path which is suitable for driving on the work path as the work vehicle approaches the work path.

That is, when the work vehicle shifts from the work path to the turning path, the posture of the work vehicle can be maintained to be suitable for driving on the work path until the work vehicle is about to shift to the turning path. Further, when the work vehicle shifts from the turning path to the work path, the posture of the work vehicle can be set to be suitable for driving on the work path from the initial stage where the work vehicle shifts from the turning path to the work path.

Accordingly, for example, even in a case where the work site is an orchard or field in which fruit tree rows, crop rows, or the like that are adjacent to the work path exist, it is possible for the work vehicle to avoid the risk of colliding with a fruit tree row, crop row, or the like when the work vehicle shifts from the work path to the turning path or shifts from the turning path to the work path without setting the connection point of the work path and the turning path to such a position that is greatly away from the end point of a fruit tree row, crop row, or the like.

As a result, it is possible to provide an automated driving system for a work vehicle with which it is possible for the work vehicle to avoid the risk of colliding with a fruit tree row, crop row, or the like when the work vehicle shifts from the work path to the turning path while shortening the non-work path such as a turning path included in the target path for automated driving as much as possible, so as to shorten the work time, reduce the fuel consumption amount, etc.

The second characteristic configuration of the present invention is that the automated driving control part does not set the control target position on the extension of the turning path when the work vehicle is located on the turning path.

According to the present configuration, when the work vehicle is located on the turning path, it is possible to avoid the risk that the work vehicle deviates from the turning path due to the control target position being set on the extension of the turning path by the automated driving control part.

Further, while the work vehicle is performing turn-driving on the turning path, even if positional deviation from the turning path occurs, the automated driving control part sets the control target position on the work path or turning path without setting the control target position on the extension of the turning path. Therefore, even in a case where positional deviation from the turning path occurs to the work vehicle, the position and posture of the work vehicle can be set to be suitable for driving on the work path when the work vehicle moves to the next work path.

The third characteristic configuration of the present invention is to include an inclination information obtainment part, which obtains inclination information of a work site on which the target path is generated, wherein the work vehicle is equipped with a spray part that sprays spray liquid, a storage part that stores the spray liquid, and a remaining amount detection part that detects a remaining amount of the spray liquid in the storage part, and the automated driving control part enables correction of the control target position, based on the inclination information and the remaining amount of the spray liquid, in a case where the work vehicle is located on the turning path.

For example, if the work vehicle is for spraying work, the remaining amount of spray liquid in the storage tank changes (decreases) each time the work vehicle shifts from a work path to a turning path. Further, if the turning path is set so as to make the work vehicle perform turn-driving toward the upper side of the inclined surface, when the work vehicle makes a turn toward the upper side of the inclination direction according to the turning path, the gravity-center position of the work vehicle is changed to the rear side of the work vehicle in the state where the amount of spray liquid inside the storage tank is low, as compared with the state where the amount of spray liquid inside the storage tank is higher, and thus the position of the ground in which this gravity-center position is reflected is changed as well.

Accordingly, there will be a difference between the turning-center position of the work vehicle performing turn-driving according to the turning path in a state where the amount of spray liquid inside the storage tank is high and the turning-center position of the work vehicle performing turn-driving according to the turning path in a state where the amount of spray liquid inside the storage tank is low, so that, in a case where the work vehicle is made to perform turn-driving at a constant turning angle, the turn-driving trajectory of the work vehicle preforming turn-driving in the state where the amount of spray liquid is low is displaced toward the turning-center side, as compared with the turn-driving trajectory of the work vehicle performing turn-driving in the state were the amount of spray liquid is higher. Therefore, positional deviation in the inclination direction from the work path is likely to occur to the work vehicle after turning.

In consideration of this point, in the present configuration, in a case where the work vehicle is located on the turning path, it is possible for the automated driving control part to correct the control target position, based on the inclination information of the work site and the remaining amount of spray liquid.

Specifically, in a case where the work vehicle performs turn-driving in the inclination direction of the inclined surface and the turning-center position of the work vehicle is thereby displaced to the lower side of the inclined surface according to the inclination of the work site at the moment and the remaining amount of spray liquid, the automated driving control part corrects the control target position, based on the inclination information of the work site and the remaining amount of spray liquid at the moment. Further, this correction prevents the work vehicle from deviating from the turning path due to displacement of the turning-center position of the work vehicle to the lower side of the inclined surface.

Accordingly, it is possible to make the work vehicle perform automated driving with high precision according to the target path even in a case where the work vehicle is made to perform turn-driving in the inclination direction of the inclined site, regardless of the amount of spray liquid inside the storage tank that differs each time the work vehicle performs turn-driving on a turning path.

The fourth characteristic configuration of the present invention is to include an obstacle detection part that detects an obstacle, wherein, in a case where the work vehicle is located on the work path, when the obstacle detection part detects the obstacle existing in a travel direction of the work vehicle, the automated driving control part sets the control target position outside the work path, based on the detection by the obstacle detection part.

According to the present configuration, in a case where the work vehicle is located on the work path, if an obstacle existing in the travel direction of the work vehicle is detected by the obstacle detection part, the automated driving control part sets the control target position to a position deviated from the work path in a direction away from the obstacle, based on the detection by the obstacle detection part, and makes the work vehicle perform driving so as to follow this control target position.

That is, the setting of the control target position that is normally set on the work path is changed to a position that is deviated from the work path, so that it is thereby possible to avoid the risk that the work vehicle collides with an obstacle existing in the travel direction of the work vehicle.

The invention claimed is:

1. An automated driving system for a work vehicle, comprising a position information obtainment part, which obtains position information of the work vehicle, and an automated driving control part, which makes the work vehicle perform automated driving according to a target path that is generated in advance,
   wherein the target path includes a plurality of work paths, which are aligned in parallel at a predetermined interval, and a plurality of turning paths, which connect the plurality of work paths in a driving order of the work vehicle,
   the automated driving control part sets a control target position, so as to thereby enable automated driving of the work vehicle according to the target path,
   the automated driving control part sets the control target position on an extension of the work path when the work vehicle is located on the work path in a vicinity of a boundary to the turning path, and
   the automated driving control part sets the control target position on the work path when the work vehicle is located on the turning path in a vicinity of a boundary to the work path.

2. The automated driving system for the work vehicle according to claim 1, wherein to maintain the position and posture of the work vehicle on the turning path, when the work vehicle is located on the turning path, the automated driving control part:
   sets the control target position on the work path, and
   prevents setting of the control target position on an extension of the turning path.

3. The automated driving system for the work vehicle according to claim 1, comprising an inclination information obtainment part, which obtains inclination information of a work site on which the target path is generated,
   wherein the work vehicle is equipped with a spray part that sprays spray liquid, a storage part that stores the spray liquid, and a remaining amount detection part that detects a remaining amount of the spray liquid in the storage part, and
   the automated driving control part enables correction of the control target position, based on the inclination information and the remaining amount of the spray liquid, in a case where the work vehicle is located on the turning path.

4. The automated driving system for the work vehicle according to claim 1, comprising an obstacle detection part that detects an obstacle,
   wherein, in a case where the work vehicle is located on the work path, when the obstacle detection part detects the obstacle existing in a travel direction of the work vehicle, the automated driving control part sets the control target position outside the work path, based on the detection by the obstacle detection part.

* * * * *